(12) United States Patent
Beals et al.

(10) Patent No.: US 6,681,795 B2
(45) Date of Patent: Jan. 27, 2004

(54) METHODS AND SYSTEMS FOR INSTALLING CABLE AND CONDUIT IN PIPELINES

(75) Inventors: Scott A. Beals, Los Angeles, CA (US); Ronald D. Hammer, Los Angeles, CA (US); Robert E. Evans, Pasadena, CA (US)

(73) Assignee: Sempra Fiber Links, San Diego, CA (US)

( * ) Notice: Subject to any disclaimer, the term of this patent is extended or adjusted under 35 U.S.C. 154(b) by 69 days.

(21) Appl. No.: 09/973,961

(22) Filed: Oct. 9, 2001

(65) Prior Publication Data

US 2002/0083976 A1 Jul. 4, 2002

Related U.S. Application Data

(63) Continuation-in-part of application No. 09/876,802, filed on Jun. 7, 2001, which is a continuation-in-part of application No. 09/685,236, filed on Oct. 10, 2000, now Pat. No. 6,536,463.

(51) Int. Cl.[7] ............................ H02G 1/08; H02G 9/06; F16L 1/028; F16L 41/04
(52) U.S. Cl. ..................... 137/318; 137/317; 137/551; 254/134.3 R; 254/134.3 FT; 254/134.4; 385/100; 405/154.1; 405/183.5; 405/184
(58) Field of Search ................... 137/15.12, 15.13, 137/15.14, 317, 318, 551; 73/40.5 A, 40.5 R, 866.5; 138/97, 155; 254/134.3 R, 134.3 FT, 134.4; 405/154.1, 155, 156, 157, 158, 159, 168.3, 174, 177, 183.5, 184; 226/1; 385/100

(56) References Cited

U.S. PATENT DOCUMENTS

| 920,455 | A | 5/1909 | Greenan |
|---|---|---|---|
| 1,658,887 | A | 2/1928 | Dotzauer |
| 2,930,584 | A | 3/1960 | Hensley et al. |
| 3,034,766 | A | 5/1962 | Hamrick |
| 4,090,534 | A | 5/1978 | Martin et al. |
| 4,169,486 | A | 10/1979 | Otteman et al. |
| 4,232,981 | A | 11/1980 | Lee |
| 4,261,204 | A | 4/1981 | Donaldson |
| 4,427,112 | A | 1/1984 | Di Giovanni et al. |
| 4,518,817 | A | 5/1985 | Kirby et al. |

(List continued on next page.)

FOREIGN PATENT DOCUMENTS

| DE | 23 55 383 A1 | 5/1975 |
|---|---|---|
| DE | 3140928 A1 | 5/1983 |
| EP | 0978715 B1 | 2/2000 |
| EP | 795 942 B1 | 8/2000 |
| GB | 108 590 | 5/1984 |

OTHER PUBLICATIONS

RM Consulting, Final Report *"Fiber Optic Cable In Live Natural Gas Lines"*, Phase 11A, Nov. 29, 1999, 3 pages.

(List continued on next page.)

*Primary Examiner*—George L. Walton
(74) *Attorney, Agent, or Firm*—Perkins Coie LLP

(57) ABSTRACT

A method of introducing a fiber optic conduit into a pressurized gas pipeline includes the step of introducing a translating member into the pressurized gas pipeline via an entry port in a first drilling fitting (18) (8, 70, 250, 300) attached to the pressurized gas pipeline. Tools are deployed within a first pressure lock housing (30) attached to the first drilling fitting by using a first manipulator (34) located in the first air lock housing. The duct rod is advanced within pressurized gas pipeline by a driving mechanism (60), until a second drilling fitting (80) is reached. The translating member is attached to a fiber optic conduit or cable. The duct rod and fiber optic conduit are then pulled back through the pressurized gas pipeline by the driving mechanism. A conduit or cable is installed in a gas service line, to provide an optical fiber between an optical fiber trunk line or ring and building.

17 Claims, 29 Drawing Sheets

U.S. PATENT DOCUMENTS

| | | |
|---|---|---|
| 4,649,948 A | 3/1987 | Hudson |
| 4,756,510 A | 7/1988 | Klamm et al. |
| 4,856,937 A | 8/1989 | Grocott et al. |
| 4,869,301 A | 9/1989 | Ohmi et al. |
| 4,892,442 A | 1/1990 | Shoffner |
| 4,917,539 A | 4/1990 | de la Salle |
| 5,042,528 A | 8/1991 | England et al. |
| 5,052,431 A * | 10/1991 | Jiles .......................... 137/318 |
| 5,090,665 A | 2/1992 | Walters et al. |
| 5,121,644 A | 6/1992 | Grey et al. |
| 5,137,047 A | 8/1992 | George |
| 5,143,353 A | 9/1992 | Sano et al. |
| 5,156,376 A | 10/1992 | Spicer |
| 5,205,542 A | 4/1993 | Keeble |
| 5,227,080 A | 7/1993 | Berry |
| 5,360,291 A | 11/1994 | Shimizu |
| 5,482,073 A | 1/1996 | Winnie et al. |
| 5,612,499 A | 3/1997 | Andrew et al. |
| 5,651,639 A | 7/1997 | Wentworth et al. |
| 5,660,202 A | 8/1997 | Rush, Jr. et al. |
| 5,749,389 A | 5/1998 | Ritrosi et al. |
| 5,778,919 A | 7/1998 | Petrone |
| 5,807,026 A | 9/1998 | Valette |
| 5,884,384 A | 3/1999 | Griffioen |
| 5,934,304 A | 8/1999 | Peterson et al. |
| 5,971,035 A | 10/1999 | Griffioen |
| 6,019,351 A | 2/2000 | Allen |
| 6,056,004 A | 5/2000 | Agnew |
| 6,130,975 A | 10/2000 | Eyres |
| 6,286,542 B1 | 9/2001 | Morain et al. |
| 6,301,414 B1 | 10/2001 | Liese et al. |
| 6,341,188 B1 | 1/2002 | Serrander et al. |
| 2002/0114595 A1 | 8/2002 | Potash |
| 2003/0068143 A1 | 4/2003 | Martinez et al. |

OTHER PUBLICATIONS

Gregor, Paul E et al., Alcatel—*Optical Fiber Cable Links With Gas Pipelines As An Alternative Telecommunications Route Technology*, International Wire Cable Symposium Proceedings 1999, 7 pages.

van Heugten, Wim H.H., "*Gastec Glass–in–gas method leads to considerable reduction in laying costs*", Gastec NV, 4 pages.

Reuters, Telecom stocks are exciting high growth in investment opportunities. Mar. 1, 2000, 1 page.

Scott, Latayne C., Nortel Targeting Utilities Telecom Business, Apr. 21, 2000, 3 pages.

Gastec, "*Glass fiber Optic Cables in Gas Pipes*", Gastec 2000, 30 pages.

\* cited by examiner

FIG. 3

FIG. 4A
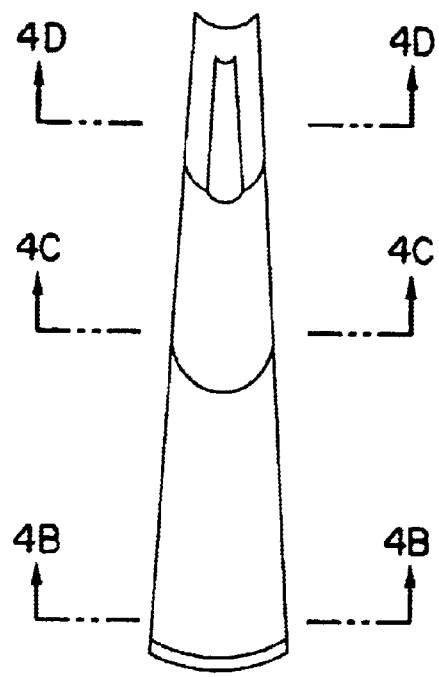
FIG. 4D
FIG. 4C
FIG. 4B

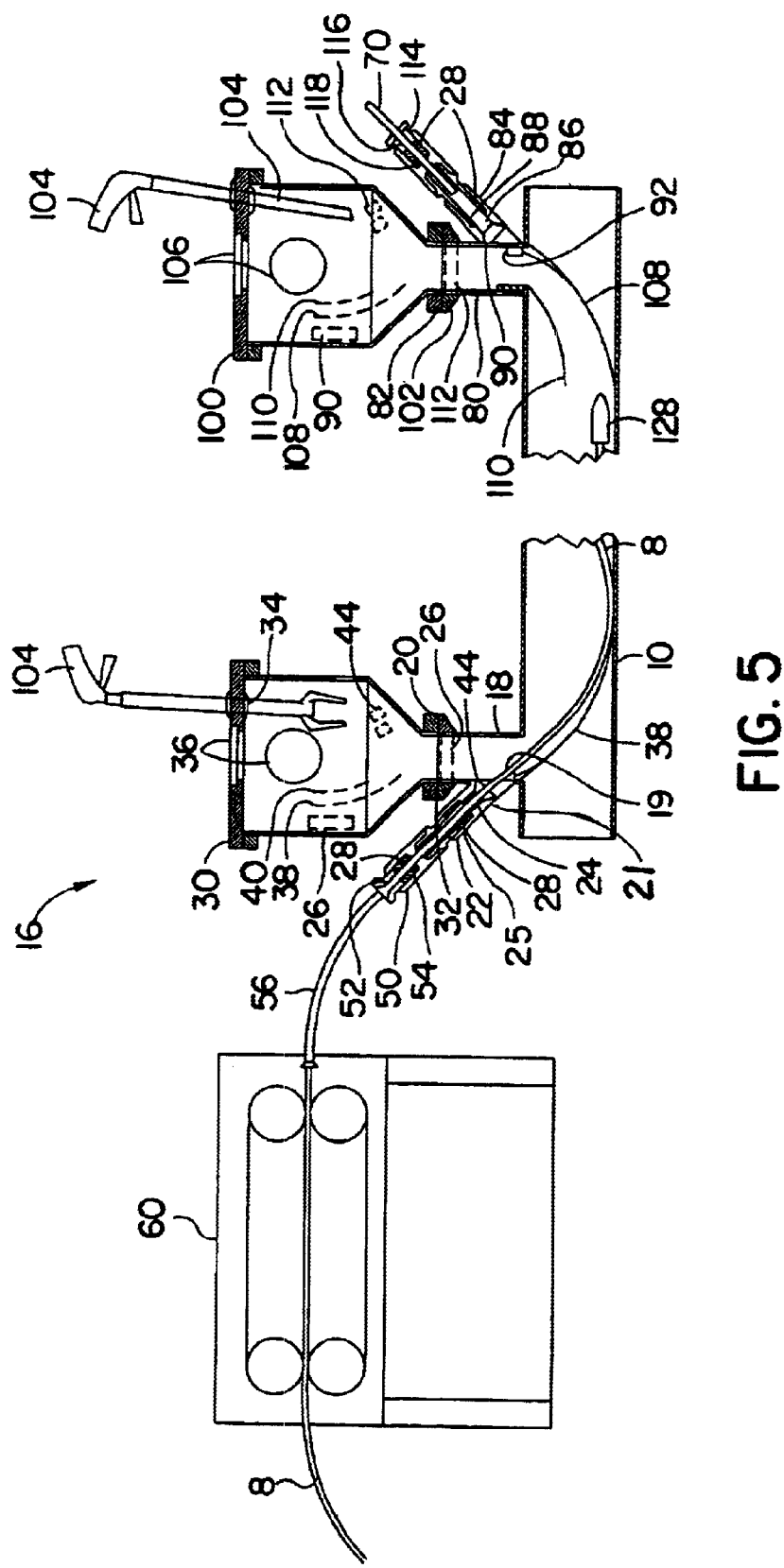

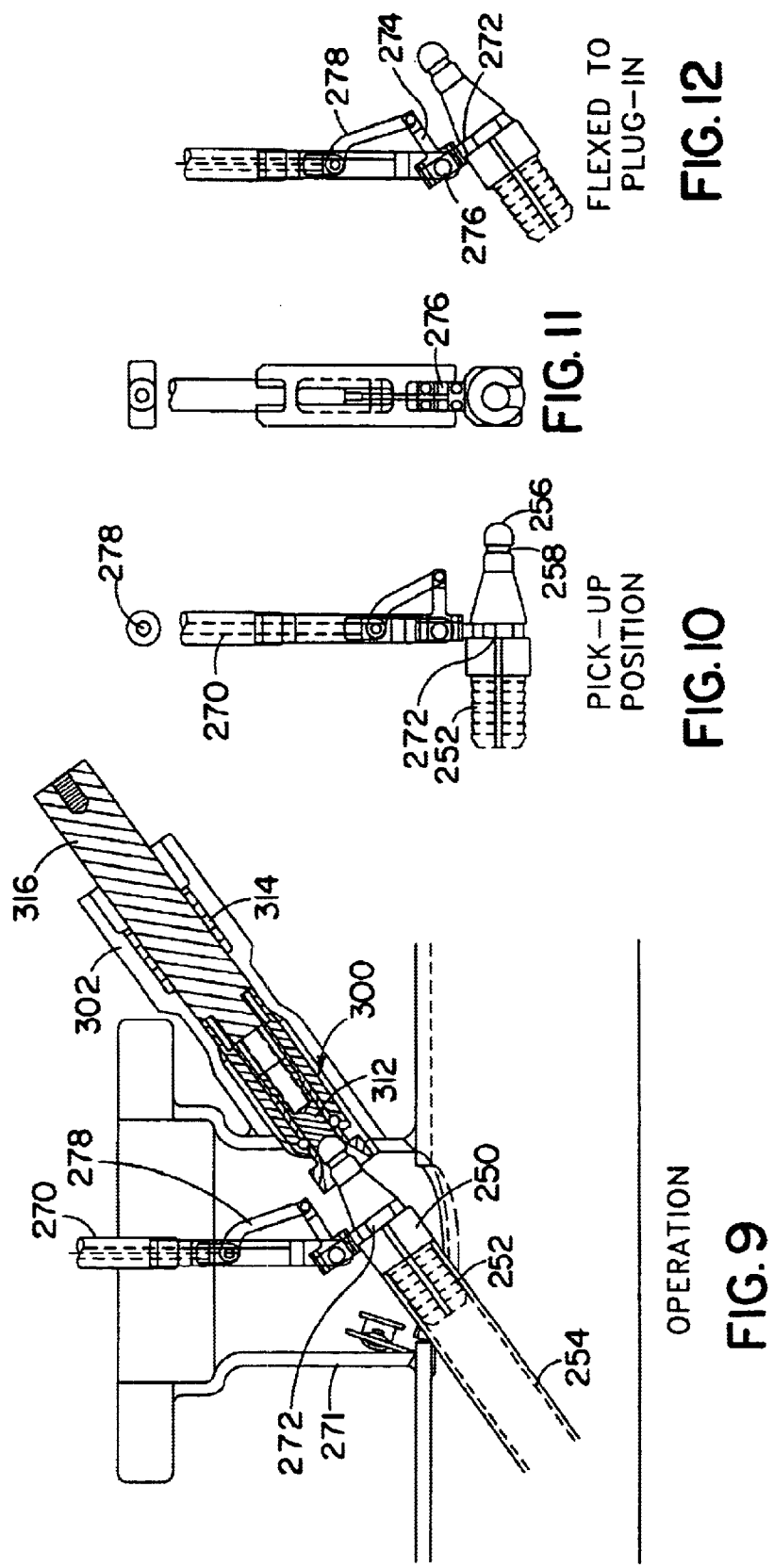

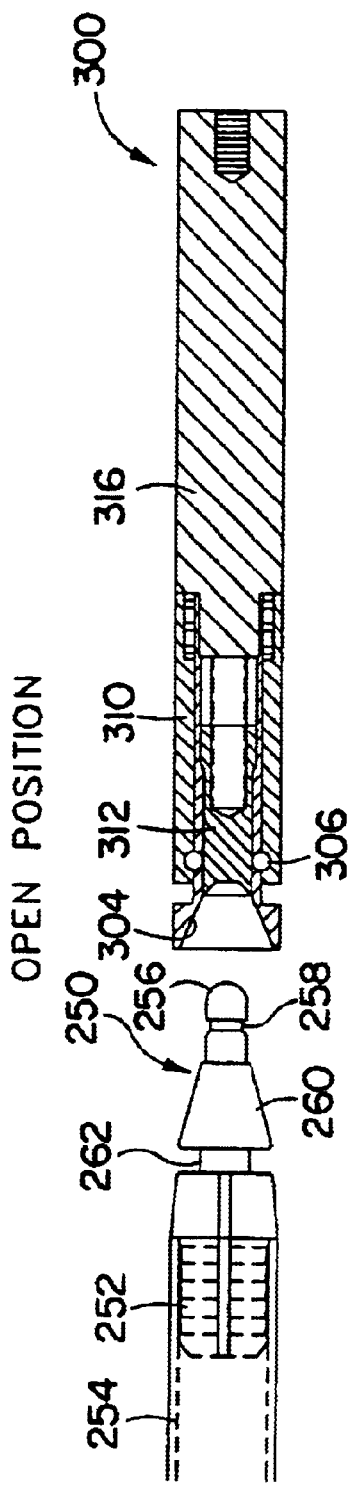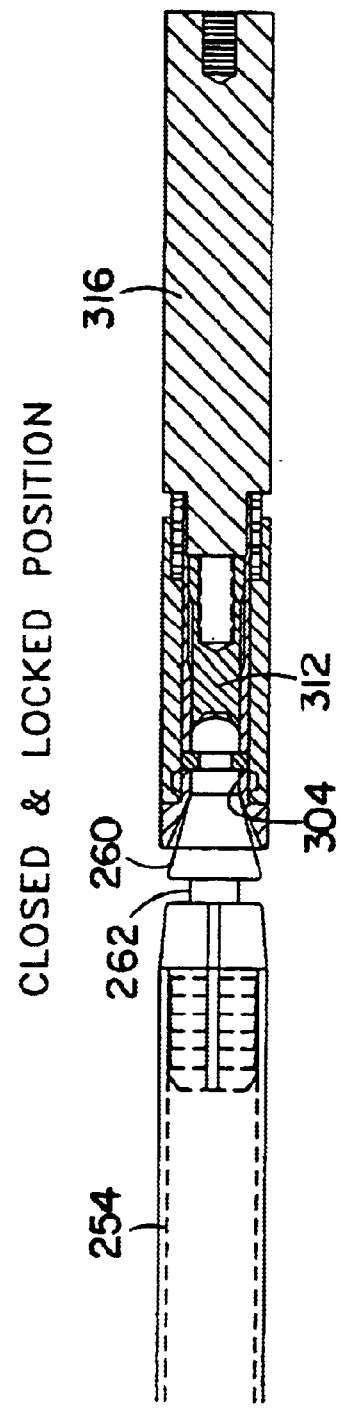

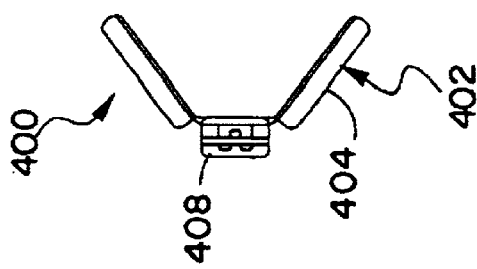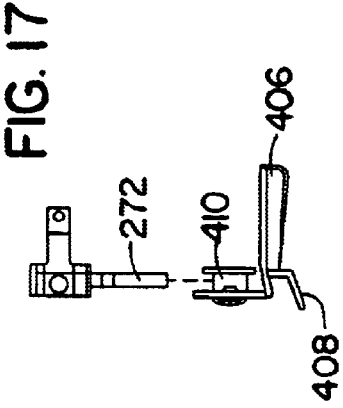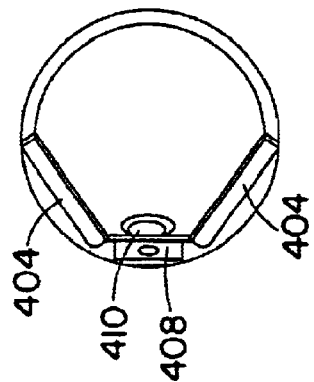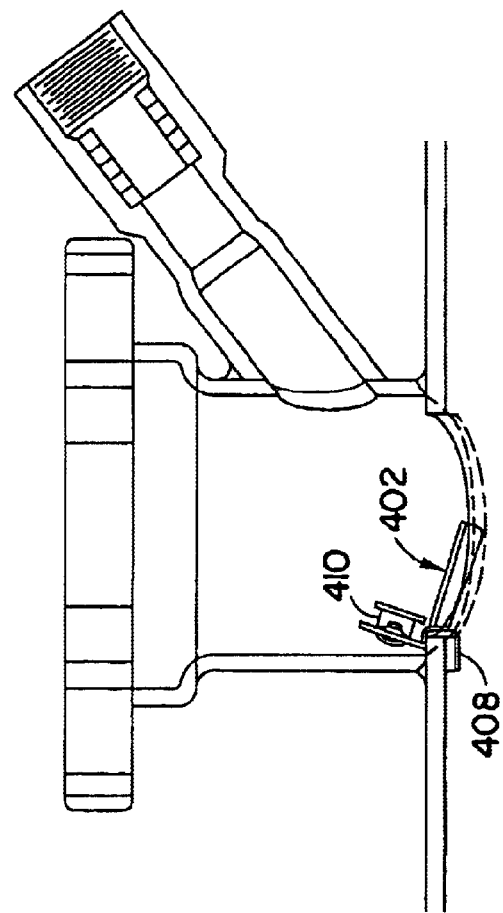

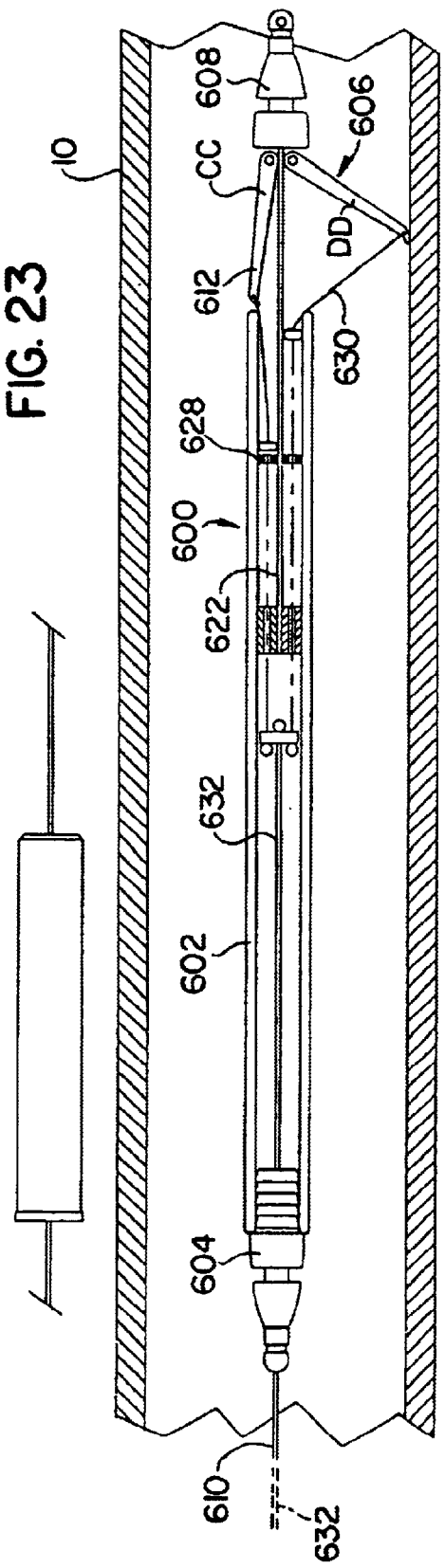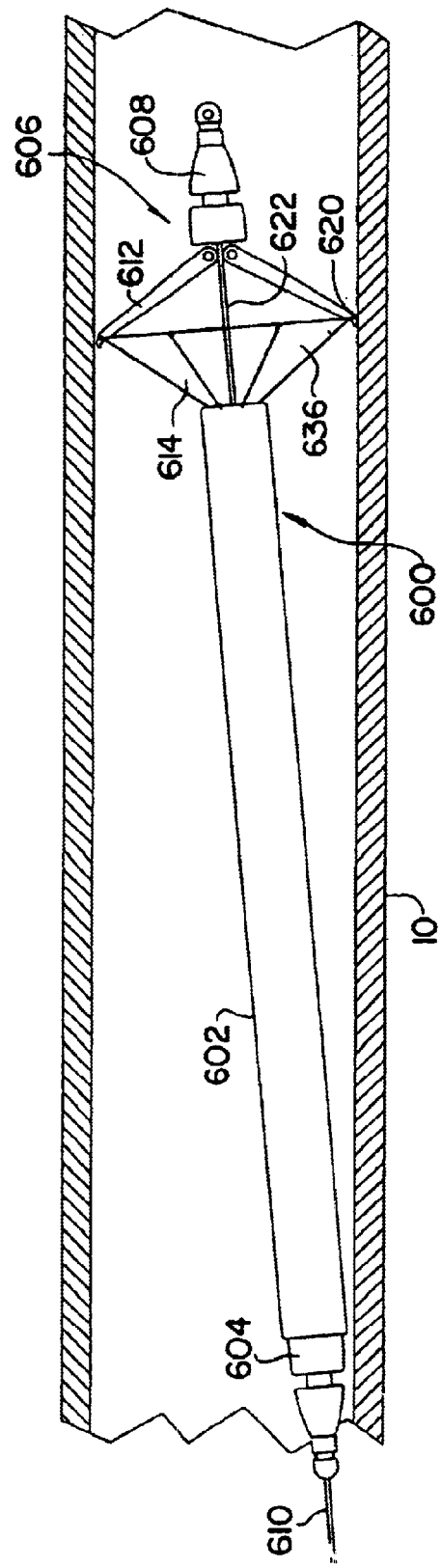

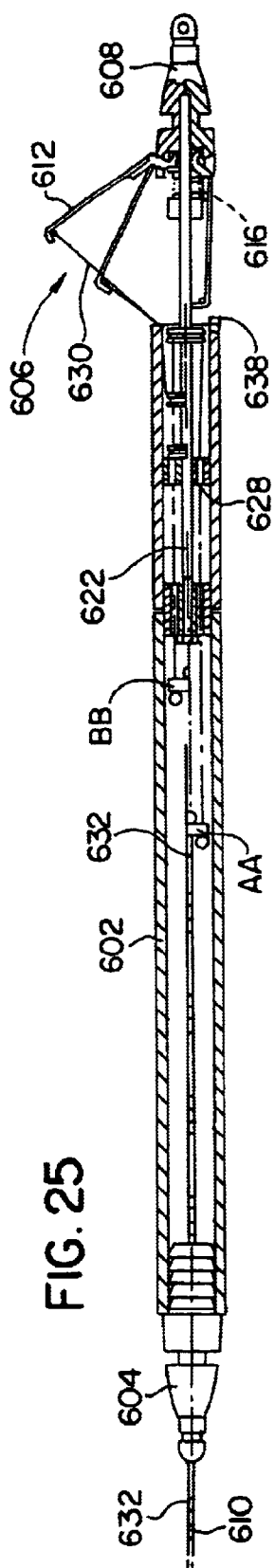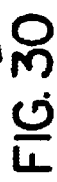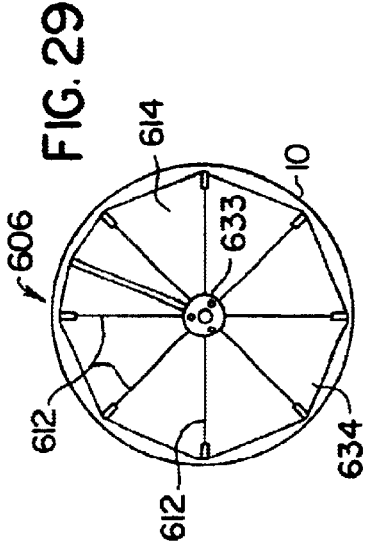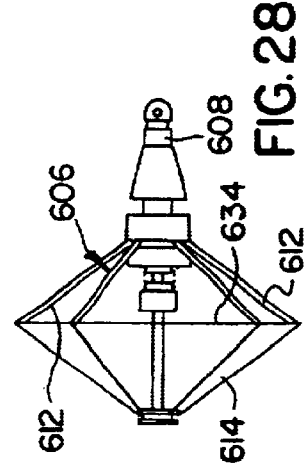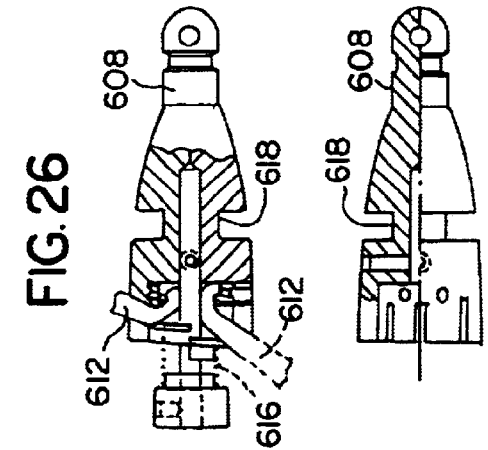

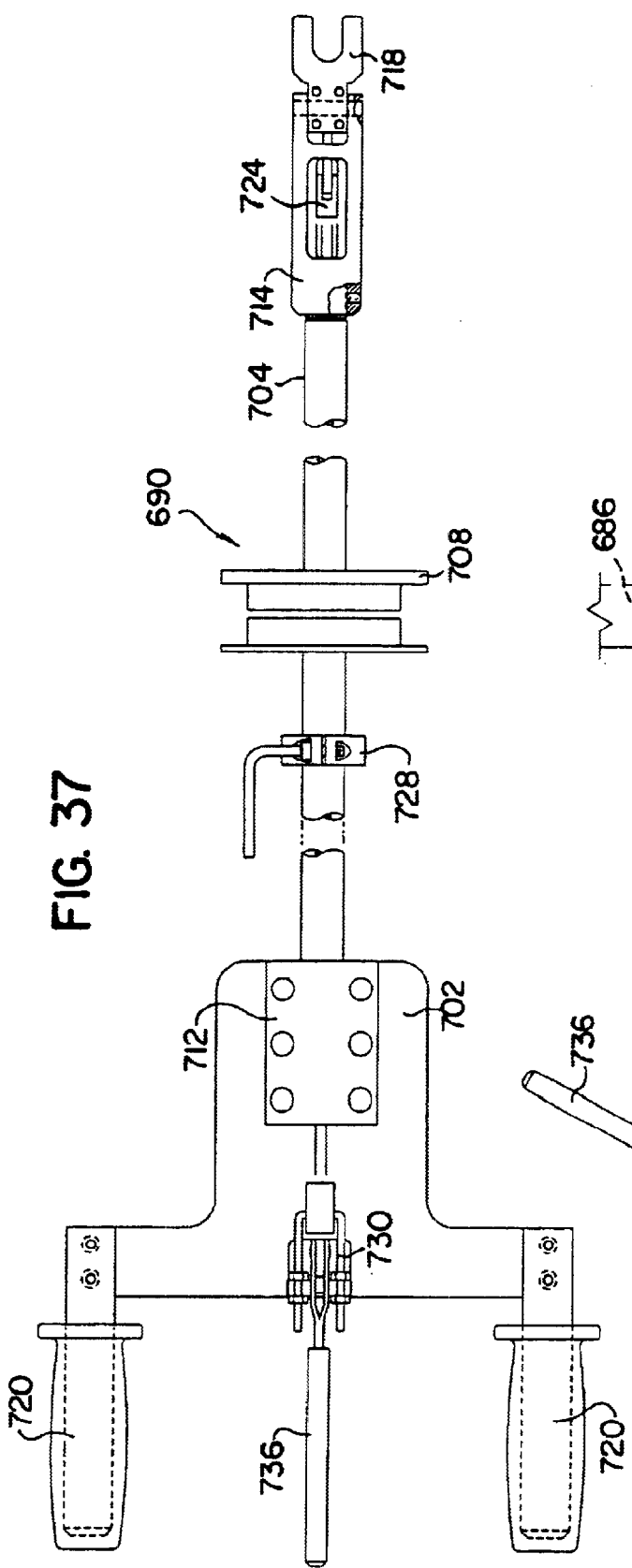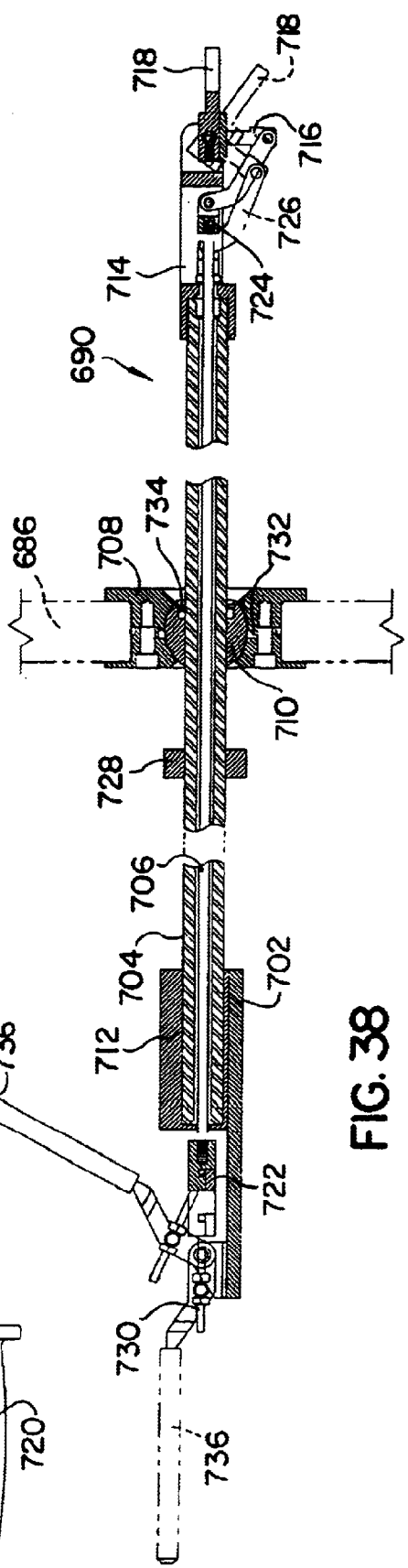
FIG. 37
FIG. 38

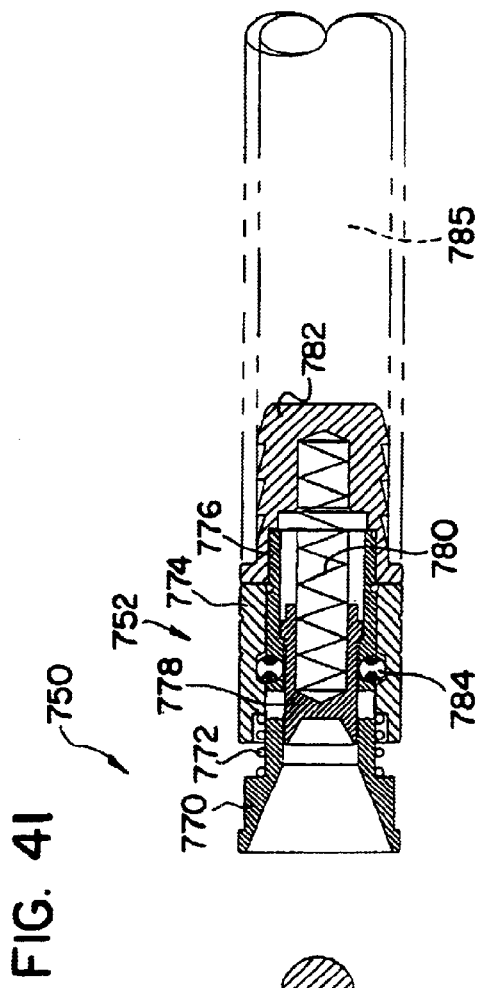
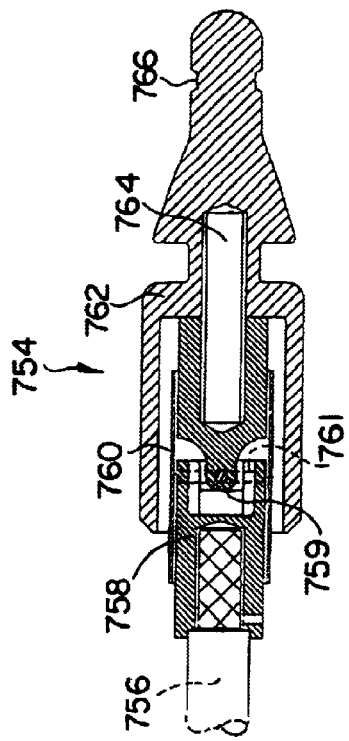
FIG. 41

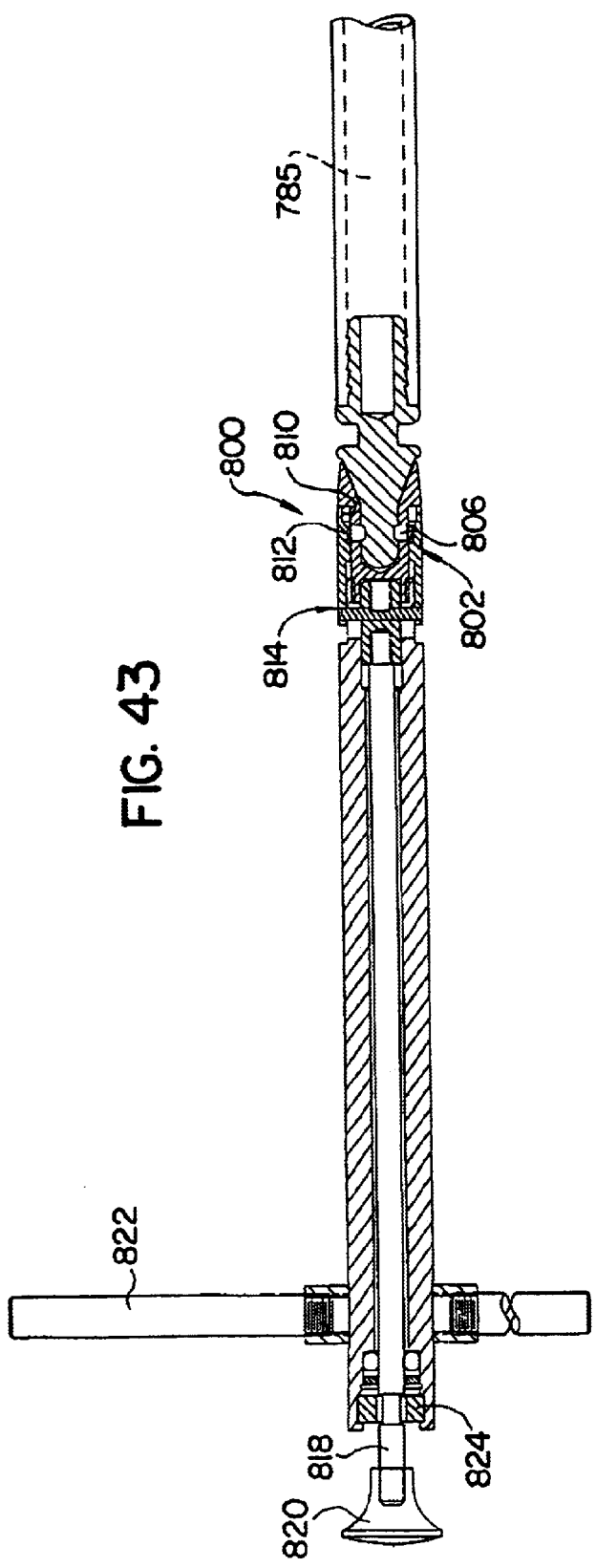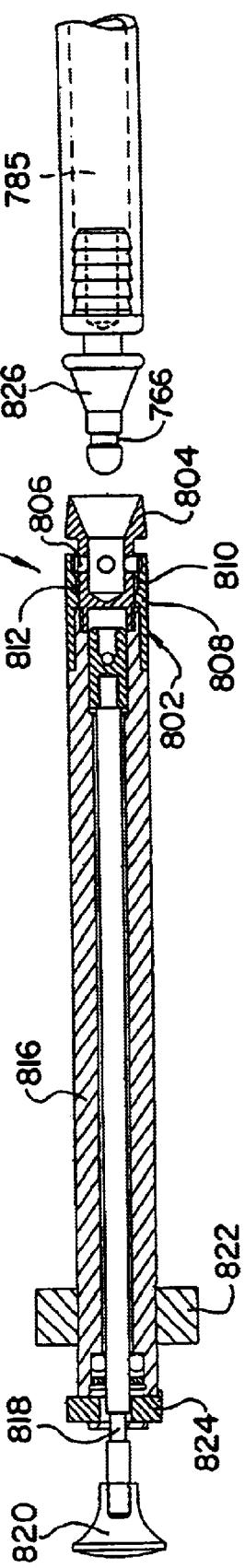

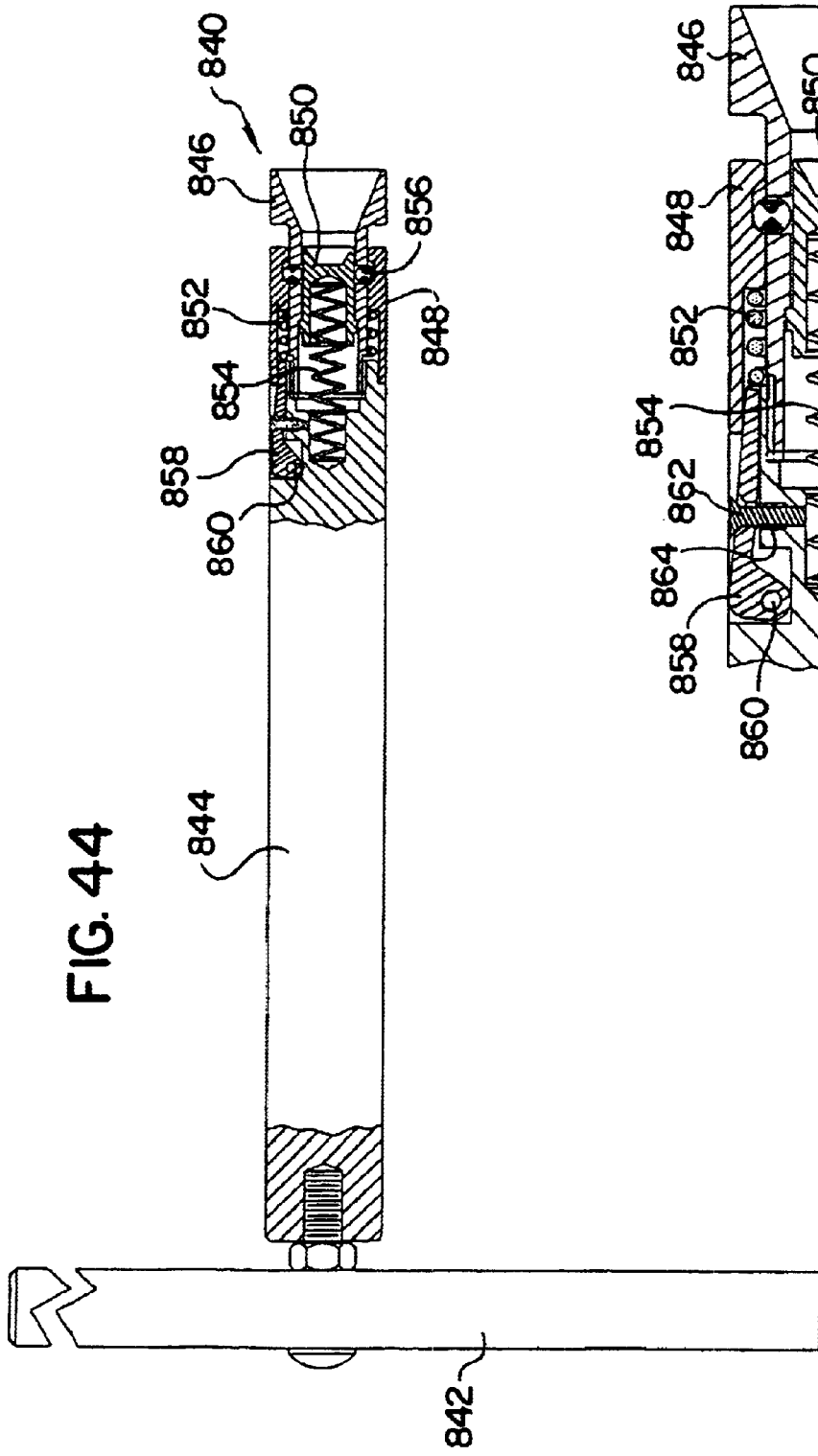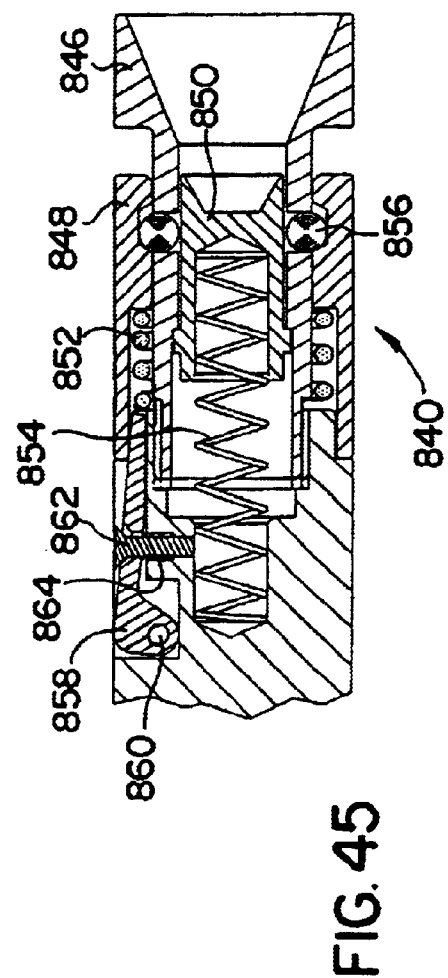

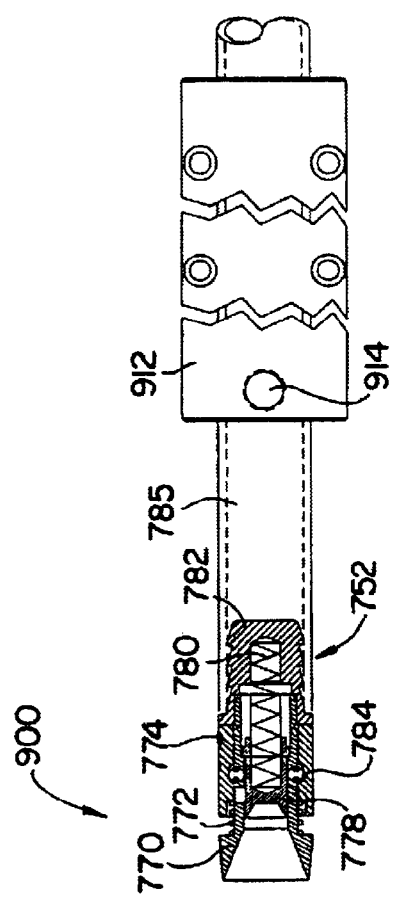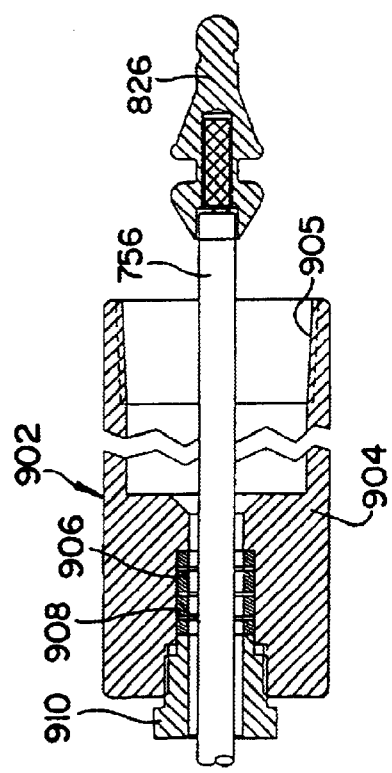
FIG. 46

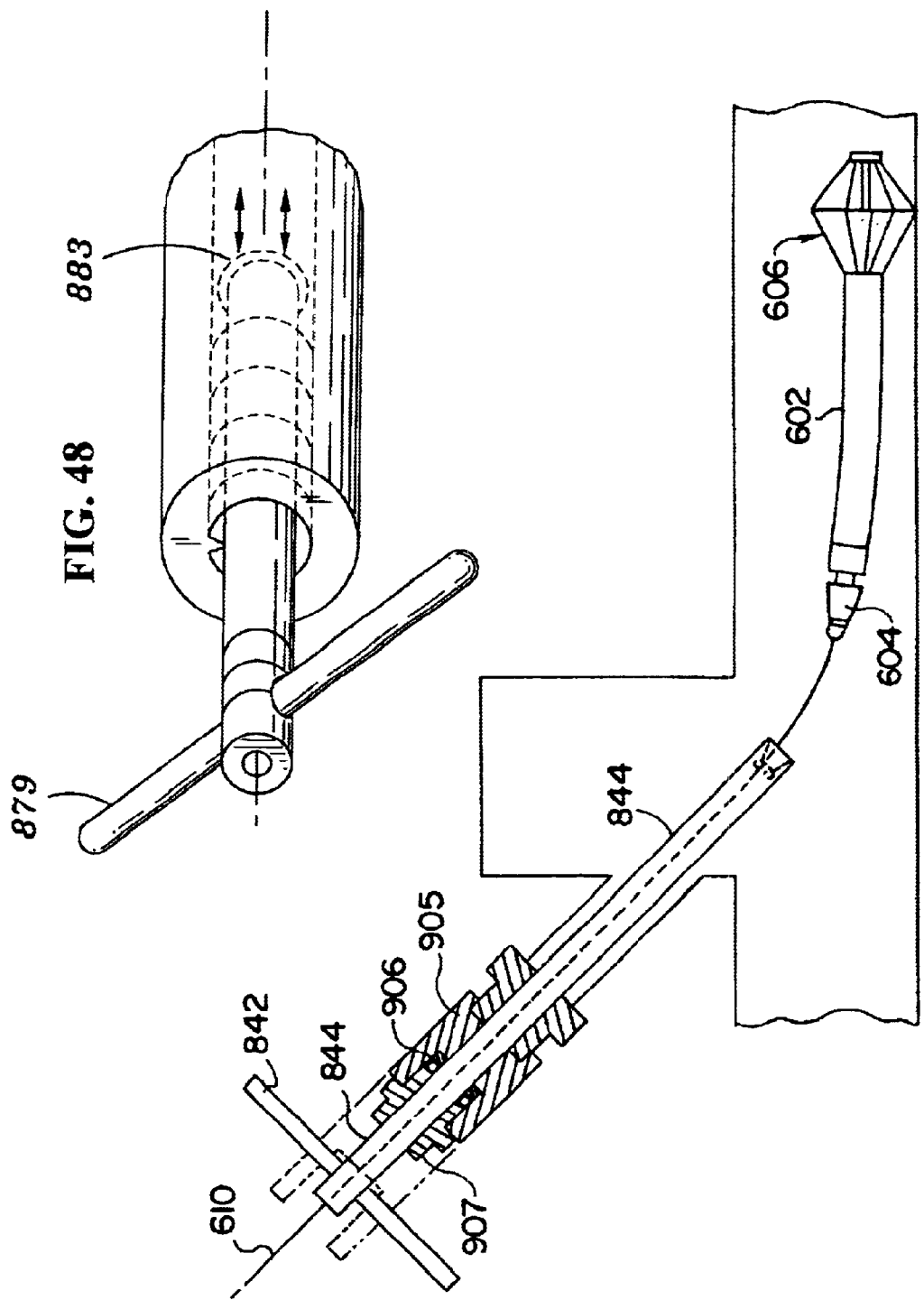

METHODS AND SYSTEMS FOR INSTALLING CABLE AND CONDUIT IN PIPELINES

This Application is a Continuation-in-Part of U.S. patent application Ser. No. 09/876,802, filed Jun. 7, 2001, and now pending, which is a Continuation-in-Part of U.S. patent application Ser. No. 09/685,236, filed Oct. 10, 2000, now U.S. Pat. No. 6,536,463. These Applications are incorporated herein by reference.

BACKGROUND OF THE INVENTION

The field of the invention is systems and methods for installing fiber optic cable or similar cables or conduits underground. More specifically, the invention relates to the installation of such cable or conduit into pressurized pipelines, such as natural gas pipelines.

With the tremendous growth of the Internet and telecommunications services in general, there has been a commensurate growth in the need to carry larger and larger volumes of data over existing and newly added communication lines. Existing copper-based communications lines, however, have a limited carrying capacity, or bandwidth, as compared to fiber optic cable. Conventional copper wires also suffer from the problem that the wire bundles are quite large as compared to their fiber optic counterparts. Additional copper wires could be installed to increase the overall capacity of a communications or data network. However, fiber optic cable is now preferred within the communications industry due to its significant advantages over copper wires.

Currently, in many countries, there are existing large scale fiber optic backbones that stretch across wide areas. Unfortunately, many businesses and consumers cannot connect to this fiber optic backbone because they are located some distance away from the main line. If copper-based lines are connected to the fiber optic backbone, the high speed and high bandwidth advantages of fiber optic cable are lost. In order to take advantage of the increased speed and bandwidth provided by fiber optic cable lines, shorter segment fiber optic lines need to be laid to reach these businesses and consumers.

Unfortunately, it is a difficult and costly procedure to lay fiber optic cable in developed regions where infrastructure such as roads, utilities, and the like are already in place. For example, it can be costly to obtain the requisite right-of-ways or easements from numerous different property owners. It can also be very costly to dig trenches to lay fiber optic cable. In addition, it is also often necessary to obtain the approval of various state and local government agencies before such work can begin. This can significantly increase the overall cost and delay the completion of the installation.

Existing gas pipelines have been considered as one potential conduit that can be used to carry fiber optic cable. By using existing gas pipelines, there is no need to obtain numerous right-of-ways or easements, since the fiber optic cable simply resides within the pipeline. In addition, long trenches do not have to be dug to lay the fiber optic cable. However, using gas pipelines as a route for fiber optic cable typically requires that sections or all of the pipeline be shut down for an extended period of time for installation of the cable. Even if the gas pipeline is not completely shut down, existing techniques interrupt the normal flow of gas.

In the past, various systems and methods have been used to install cable or conduit in liquid pipelines. These known systems and methods have met with varying degrees of success. However, these liquid pipeline systems are generally not well suited for use in gas pipelines. Providing adequate seals in gas pipelines is typically more difficult and requires sealing techniques which are different from those used with liquids. In addition, as liquids are much denser or heavier than gas, the large current or flow forces available in a liquid pipeline for carrying a drogue or similar devices, are not available in gas pipelines. In addition, the buoyant forces of a liquid pipeline, which can help to center and convey a drogue or conduit line, are not available in a gas pipeline. Hence, installing a conduit or cable into a gas pipeline presents unique engineering challenges. On the other hand, techniques which work for gas pipelines will generally also be useful with liquid pipelines.

Accordingly, there is a need for a relatively quick and inexpensive way of installing fiber optic cable, or conduit which can be used to house the cable, into existing pipelines such as natural gas pipelines.

BRIEF STATEMENT OF THE INVENTION

In a first aspect of the invention, a method of installing cable into a pressurized pipeline includes the step of attaching a first air or pressure lock housing to the pressurized pipeline at a first location, preferably via a first access fitting. A second air or pressure lock housing is attached to the pressurized pipeline at a second location, also preferably via a second access fitting. Duct rod is preferably fed into an entry port of the first access fitting. A rod end guide, such as a guide ball, may be attached to the end of the duct rod via a manipulator within the first air or pressure lock housing or may be attached outside the pipeline. The duct rod is pushed or routed to the second location and guided into the second access fitting.

The rod end guide or ball, if used, is then advantageously removed from the duct rod if necessary via a second manipulator in the second air lock housing. Fiber optic cable or a similar cable or flexible conduit, is attached to the duct rod. The duct rod and the fiber optic cable or conduit are pulled back through the entry port and/or pushed forward through the second entry port. The pipeline is then sealed and the first and second air lock housings may then be removed. In the case of conduit installation, the fiber optic or other cable can be installed using conventional techniques at any time after the conduit is installed.

A second and separate aspect of the invention includes the steps of attaching a first drilling fitting or nipple to the pressurized pipeline at a first location. A first valve is attached to the first drilling fitting. A duct rod is partially inserted into the entry port of the first drilling fitting to seal the entry port. A cutting or drilling tool is attached to the valve, and sealed against the valve. The valve is opened. A pipe cutter of the cutting tool is extended through the open valve to cut or drill a hole into the pressurized pipeline through the first drilling fitting. The drilling fitting and pipe cutter are preferably perpendicular to the pipeline to facilitate the drilling operation. The cutter is withdrawn and the valve is then closed. The cutting tool is removed.

A first air lock housing is installed on the first valve. The valve is opened and the pressure is equalized between the first air lock housing and the pressurized pipeline. A guide ball or similar duct rod end guide may be attached onto the end of the duct rod using a first manipulator in the first air lock housing.

A second drilling fitting is attached to the pressurized pipeline at a second location. The exit port of the second drilling fitting is sealed. A second valve is attached to the second drilling fitting. A cutting or drilling tool is attached and sealed against the valve. The valve is opened. A cutter is extended from the cutting tool and a hole is cut or drilled into the pressurized pipeline through the second drilling fitting. The cutter is withdrawn and the valve is closed. A second air lock housing is installed on the second drilling fitting. The second valve is opened and pressure is equalized.

A duct rod is pushed along inside of the pressurized pipeline and guided into the second drilling fitting. At the second drilling fitting, the guide ball or other rod end guide, if any, is removed from the duct rod with a second manipulator. The duct rod is attached to a fiber optic cable or conduit. The duct rod and the conduit are pulled through the pipeline (either back or forward). First and second completion plugs are installed on the first and second drilling fitting. The pressure is released in the first and second air lock housings. The first and second air lock housings and the first and second valves can then be removed.

In another aspect of the invention, a guide trough can be advantageously deployed using a manipulator in the air lock housing. The guide trough receives the duct rod or conduit and directs the duct rod or conduit through the exit port. The guide trough is preferably designed to provide guidance for duct rod, fiber optic cable, or conduit without changing troughs. The deployable trough and shield are removably stored in the second and/or first air lock housing. The trough may be left in the pipeline permanently. The trough may be perforated to reduce flow resistance. If the trough is not used, the cable, guide rod or conduit can be guided into the exit gland without use of a trough by the manipulator.

In yet another aspect of the invention, a preferably plastic conduit is used in place of the duct rod. The conduit is typically driven by a driving mechanism and enters the pressurized pipeline via the entry port. The conduit may be used in the methods described above, in place of the duct rod. The fiber optic cable is then pushed, pulled or air-blown through the plastic conduit using conventional installation techniques.

In another aspect of the invention, when a cable is directly installed, a mechanism for sealing the cable to the gas pipeline is employed. For conduit, a conduit seal is installed between the conduit and pipeline, and a cable seal is installed between the cable inserted into the conduit (at a later time) and the conduit.

In another aspect, a sail system is deployed in the pipeline. The sail system is lightweight. By occluding almost the entire cross section of the pipeline, the sail system can generate sufficient force from the flowing gas to move the sail system through the pipeline. A lightweight heave line is attached to the sail system and is used for pulling the sail system, and a conduit attached to the sail system, at an exit port, back through the pipeline.

In another separate aspect, a jet reaction nosepiece is attached to a conduit and installed into a pipeline. Compressed gas supplied through the conduit flows rapidly out of rear facing jet nozzles on the nosepiece, helping to propel the conduit forward through the pipeline.

In another separate aspect, the systems, components and methods described for use with cable and conduit are used to install a gas pipe inner duct into an existing pipeline. This provides a new pipeline within the existing pipeline.

The methods and apparatus allow for the installation of fiber optic or other cable, or an inner duct, into pressurized gas pipelines without requiring any shutoff or interruption in gas service. In addition, no bypass pipeline is needed to maintain service to customers connected to the pipe section where cable/conduit is being installed. The methods are suitable for pipelines as small as a few centimeters, and may also be used in both metal and plastic pipelines.

In another and separate aspect, a method is providing for connecting a conduit or cable from a gas main pipeline, through a service line pipeline, to a building. In this method, the service line is first closed off from the main pipeline. First and second fittings are installed in the service line. A service line conduit is preferably routed through the first fitting, the service line, and the second fitting. The fittings are sealed to prevent natural gas leaks after the service line is re-opened to the main pipeline. The service line conduit is sealed to the service line fittings. Bridge conduits are preferably placed between the first service line fitting and the main fiber cable splice connection location and between the second service line fitting and the building fiber splice connection location. A branch fiber cable is then routed through both bridge conduits and the service line conduit.

The invention resides as well in sub-combinations of the methods and systems described. The tools and fittings described also constitute separate inventions to be claimed, apart from systems and methods. These items may also be provided as a kit.

It is an object of the invention to provide a method and system for installing fiber optic or similar cable or conduits into existing pressurized gas pipelines without interrupting the flow of gas in the pipeline.

It is also an object of the invention to provide a method for installing fiber optic cable with use of existing standard fittings, to a large extent, to assist in the deployment and reduce the cost of the fiber optic cable installation.

BRIEF DESCRIPTION OF THE DRAWINGS

FIG. 3 is a schematic view of the system and methods of the present invention, with an installation device pulling the duct rod and fiber optic conduit back through the pressurized gas pipeline.

FIG. 4A is a front view of a guide trough.

FIGS. 4B, 4C and 4D are section views taken at lines 4B—4B, 4C—4C, and 4D—4D of FIG. 4A.

FIG. 5 is a side view of the installation device according to alternative embodiment of the invention.

In FIGS. 6 and 7, the pipe fitting, valve, and air lock components are the same on the inlet and exit ends, although they are not fully illustrated on the inlet end. For purposes of illustration, the airlock on the inlet end of FIG. 6 is replaced with the pipe drilling or cutting machine, while in FIG. 7, a top view of the drilling fitting and the hot-tap gate valve is shown.

FIG. 9 is a section view of another embodiment for use with conduit.

FIG. 10 is a side view of the manipulator of FIG. 8 in the pick up position.

FIG. 11 is a front view thereof.

FIG. 12 is a side view of the manipulator of FIG. 9 in the plug in position.

FIG. 13 is a section view of an end coupler aligned for engagement with the conduit end shown in FIGS. 9–12.

FIG. 14 is a section view of the end coupler of an extraction tool and conduit end of FIG. 13 coupled together.

FIG. 16 is a top view of a corner shield.

FIG. 17 is a side view thereof also showing engagement of the corner shield by a manipulator.

FIG. 18 is a top view showing the corner shield of FIG. 16 installed in a pipeline.

FIG. 19 is a side view of the installation shown in FIG. 18.

FIG. 23 is a section view of a sail system for use in a pressurized gas pipeline.

FIG. 24 is a side view thereof, showing a typical position of the sail system, in use within a pipeline.

FIG. 25 is a section view of the sail system shown in FIGS. 23 and 24, and further illustrating alternate positions of components shown.

FIG. 26 is a section view of the sail cap shown in FIG. 23.

FIG. 27 is a side view of the sail cap shown in FIG. 26.

FIG. 28 is a side view of a deployed sail and sail cap.

FIG. 29 is a front end view of the deployed sail system shown in FIG. 24.

FIG. 30 is a top view of a sail fabric pattern.

FIG. 37 is a front view of a manipulator arm assembly.

FIG. 38 is a section view of the manipulator arm assembly shown in FIG. 37.

FIG. 41 is a section view of an extraction assembly for use with duct rod operations. A butt nose fitting is attached to a duct rod and an extractor fitting is attached to a conduit.

FIG. 42 is a section view of a manual extraction assembly tool for use with conduit operations, for example as shown in FIGS. 9–12, in the unlocked or disengaged position.

FIG. 43 is a section view thereof in the engaged position.

FIG. 44 is a side view in part section of another extraction tool for use with conduit.

FIG. 45 is an enlarged section view of the front end of the tool shown in FIG. 44.

FIG. 46 is a section of another alternative extraction tool and a u-joint nose fitting for use with duct rod operations.

FIG. 47 is a side view of stuffing tool useful for installing and removing the sail assembly shown in FIGS. 25–32.

FIG. 48 is a partial perspective view of the stuffing tool shown in FIG. 47.

DETAILED DESCRIPTION OF THE DRAWINGS

Figure 1:
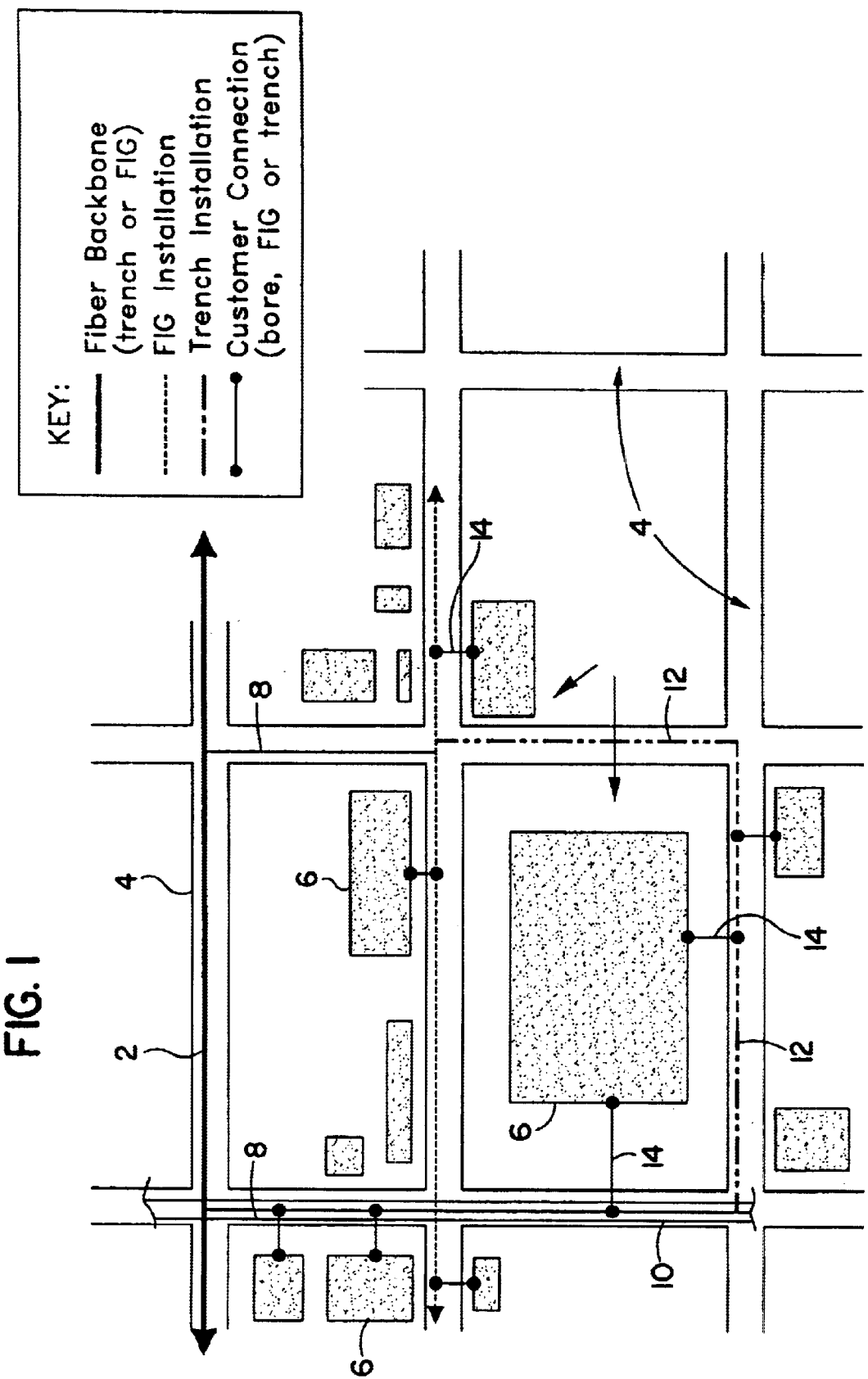
FIG. 1 is a plan view of a geographical area that has installed fiber optic cable or conduit in underground pressurized gas pipelines.

FIG. 1 illustrates a map or plan view of a portion of an urban area such as a city, town, university campus, etc. A main fiber optic backbone 2 runs underneath one or more of the streets 4. Various buildings 6 are dispersed in the vicinity of the main fiber optic backbone 2. These buildings 6 can be individual properties, or alternatively, the buildings 6 can be campuses consisting of multiple properties. Fiber optic conduit 8 that contains one or more bundles of fiber optic cable is shown branching from the main fiber optic backbone 2 under the streets 4. The fiber optic conduit 8 is located in pressurized gas pipelines 10 located underground. The fiber optic conduit 8 is installed in accordance with the methods and devices described in below.

Still referring to FIG. 1, in some of the streets 4 there are no existing pressurized gas pipelines 10, or the pipeline size or available capacity is such that it is not suited for installation of conduit or cable. In this case, the fiber optic conduit 8 is preferably installed in a conventional manner by digging trenches 12 or boring holes through which conduit can be installed. The trenches 12 are preferably dug to meet with existing pressurized gas pipelines 10. In order to get the fiber optic conduit 8 from the pressurized gas pipelines 10 to the buildings 6, individual customer connections 14 are installed to bring the fiber optic cable (contained within fiber optic conduit 8) directly to a customer site. In some instances, such as the larger building 6 shown in the center of FIG. 1, multiple customer connections 14 may be made.

The customer connections 14 may be installed in various ways. For example, a trench 12 can be dug to lay the fiber optic conduit 8 from the pressurized gas pipeline 10. Alternatively, a bore can be drilled or otherwise formed to route the fiber optic conduit 8 into a building. It is also possible that the fiber optic conduit 8 can be directly fed into the pressurized gas pipeline 10 leading to the building 6. This method may be more feasible (due to capacity limitations) where larger diameter service line pipes are used, for example, where the business 6 is a high volume user of natural gas.

Figure 2:
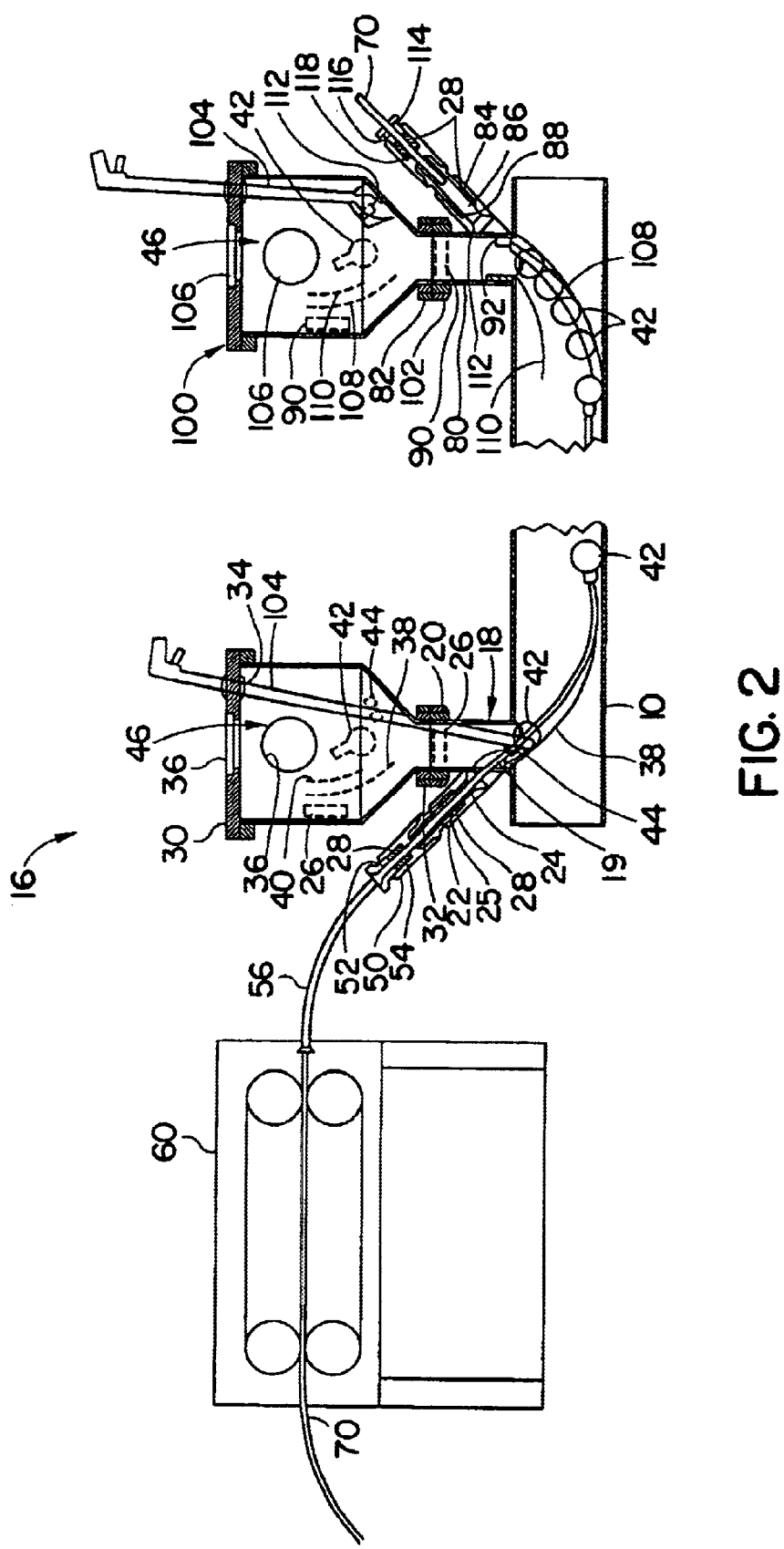
FIG. 2 is a schematic view of the system and methods of the present invention, with an installation device pushing a duct rod and guide ball through a pressurized gas pipeline.
Figure 3:
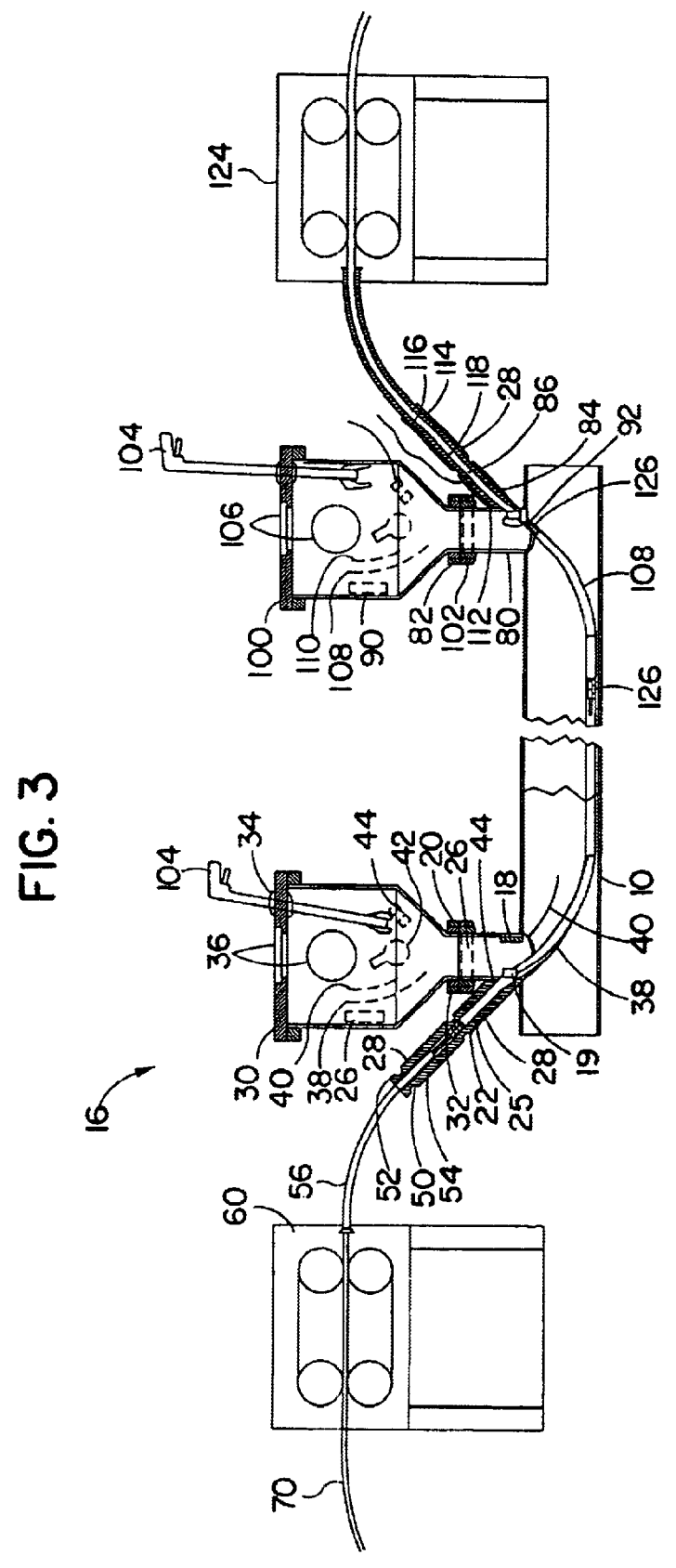

Referring now to FIGS. 2 and 3, a system 16 is shown for the installation of fiber optic conduit. A first access or drilling fitting 18 is attached to the exterior of the pressurized gas pipeline 10, typically by welding. The first drilling fitting 18 includes a flange portion 20, and a side arm 21 including an entry gland 22. The side arm 21 is preferably at an angle of 30–40° to the pipeline, to clear holes while maximizing the feeding force in the direction of the pipeline, and to minimize bending of cable. The entry gland 22 and the first drilling fitting 18 connect into the interior or lumen of the pressurized gas pipeline 10. The entry gland 22 can include a bore 24 that at one end receives a split plug seal 44, if needed to temporarily seal the gland while changing fittings or packings. The entry gland 22 also includes a recess 25 for holding a temporary packing material 28 such as TEFLON (resinous fluorine polymers) or a permanent elastomer seal such as VITON (synthetic rubber). A first completion plug 26 is shown in phantom in the first drilling fitting 18. The first completion plug 26 is removable from the first drilling fitting 18 as described below. The angle of the entry/exit port and the side arm 21 is preferably optimized to allow the maximum possible bend radius for the cable or conduit to produce the greatest amount of force in the direction of the pipe when pushing axially on the duct rod or conduit from outside the pipe.

A first pressure or air rock housing 30 is mounted to the flange portion 20 of the first drilling fitting 18, preferably via a flange and bolts 32. The first air lock housing 30 includes a interior portion or space 46 where various components and tools can be hung, placed in receivers or otherwise stored. A first manipulator 34 extends through the first air lock housing 30 into the space 46. Preferably, the first manipulator 34 includes one or more manipulator arms that can be rotated and/or extended at a wide angle from vertical within the first air lock housing 30. The first manipulator 34 is sealed against gas pressure when the first air lock housing 30 is pressurized. The first air lock housing 30 also includes a viewing port 36 in the top of the first air lock housing 30. The viewing port 36 permits an operator to visually observe the interior portion of the first air lock housing 30 and first drilling fitting 18 and the internal portion of the pipeline in the vicinity where the access hole is drilled or cut.

As shown in dotted lines in FIG. 2, inside the first air lock housing 30 is the first completion plug 26, a first guide trough 38, a corner shield 40, a guide ball 42, and tapered split plugs 44. These items are movable or installable within the first air lock housing 30 via the first manipulator 34 and can be used in the installation of the fiber optic cable or conduit 8. The first guide trough 38 and the corner 40 shield are preferably coated with a low friction polymer coating such as TEFLON.

A removable packing gland 50 is engaged to and seals with the entry gland 22. The removable packing gland 50 includes a bore 52 connecting to the bore 24 of the entry gland 22. The removable packing gland 50 also includes a recess 54 for holding packing seal 28 such as TEFLON or VITON. A guide duct 56 is preferably located on an end of the removable packing gland 50 to aid in guiding the duct rod 70 through removable packing gland 50.

Still referring to FIG. 2, a first driving mechanism or rod driver 60 is located relatively near the first drilling fitting 18 and the first air lock housing 30. The first rod driver 60 provides the moving force to push and pull the duct rod 70 through the pressurized gas pipeline 10. Preferably, the first rod driver 60 is a commercial tractor feeder. The first rod driver 60 engages or grips the duct rod 70. The duct rod 70 is preferably made from a glass-reinforced composite polymer that is typically used as a snake for cable pulling. The duct rod 70 advantageously includes a polymer coating such as TEFLON or the like to aid in pushing and pulling through the pressurized gas pipeline 10. The duct rod can be any of those commercially available with a diameter that fits the dimensions of the removable packing gland 50, typically 10–12 mm OD.

Test results show that steel duct rod works well in plastic pipelines, and fiberglass duct rod works well in steel pipelines. However, fiberglass duct rod may not be stiff enough for use over long distances. Steel duct rod coated with a low friction material, such as a polymer, is preferred for use in metal or steel pipelines, especially over long distances. The duct rod may be installed and routed using a tractor feeder, which can push or pull the duct rod. Alternatively, a power rod feeder, which can push, pull, and simultaneously turn or rotate the duct rod, may be used.

FIG. 2 also shows the guide attachment, in this case a ball 42 connected to the end of the duct rod 70. The guide attachment 42 is removably connected to the duct rod 70 during the installation process if it is too large to fit through the entry/exit glands. The guide attachment 42 helps prevent the duct rod 70 from getting stuck in the pressured gas pipeline 10 from such things as burrs, slag, and the like. The guide attachment 42 preferably has an outer diameter small enough to fit through the hole drilled in the pipeline typically about 30–60 mm. The invention can be used with small diameter or larger diameter pipelines. FIG. 2 also shows the first guide trough 38 connected to the first drilling fitting 18. The connection is made via studs 19 or other suitable mans for attaching the trough in a stable manner. The first guide trough 38 is deployed from the first air lock housing 30 and helps in the introduction and removal of the duct rod 70 and fiber optic conduit 8.

Still referring to FIG. 2, a second access or drilling fitting 80 is attached to the exterior of the pressurized gas pipeline 10, typically from about 100 to 500 meters from the first fitting. The second access or drilling fitting 80 includes a flange portion 82 and an exit gland 84. The exit gland 84 in the second drilling fitting 80 connects with the interior of the pressurized gas pipeline 10. The exit gland 84 includes a bore 86 tapered at one end for receiving split plugs 112. The exit gland 84 also includes a recess 88 for holding a packing material 28. A second completion plug 90 is shown in dotted lines in the second drilling fitting 80. The second completion plug 90 is removable from the second drilling fitting 80.

A second air lock housing 100 is mounted to the flange portion 82 of the second drilling fitting 80, preferably via bolts 102. The second air lock housing 100 also includes an interior portion or space 46 where various components and tools can be stored. A second manipulator 104 extends into the interior space 46 of the second air lock housing 100. Preferably the second manipulator 104 includes a manipulator arm that can rotate and/or extend at a wide sweep of angles from vertical within the second air lock housing 100 The second manipulator 104 is sealed against the gas pressure when the second air lock housing 100 is pressurized. The second airlock housing 100 also includes a viewing port 106 in the top of the second airlock housing 100. The viewing port 106 permits an operator to visually observe the interior portion of the second air lock housing 100 and to see into the pipeline.

As shown in dotted lines in FIG. 2, the second completion plug 90, a second guide trough 108, a corner shield 110, a guide ball 42, and tapered split plugs 112 are stored inside the second air lock housing 100. These items are moveable/installable within the second air lock housing 100 via the second manipulator 104.

A second removable packing gland 114 is engaged to and sealed with the exit gland 84. The second removable packing gland 114 includes a bore 116 connecting with the bore 86 of the exit gland 84. The second removable packing gland 114 also includes a recess 118 for holding packing material 28.

Referring now to FIG. 3, a second rod driver 124 is positioned near the second drilling fitting 80 and the second air lock housing 100. The second driving mechanism 124 feeds the fiber optic cable or conduit 8 into the pressurized gas pipeline 10 via the second removable packing gland 114. Preferably, the second driving mechanism 124 is a commercial tractor feeder. A guide duct 120 is advantageously located on an end of the second removable packing gland 114 to aid in guiding fiber optic conduit 8 through the second removable packing gland 114. Both rod drivers can push or pull the rod, fiber optic cable or conduit as required.

Referring back to FIG. 2, the second guide trough 108 is shown in its deployed configuration, wherein the second guide trough 108 is positioned by attaching to pipeline 10 or second drilling fitting 80 via studs 92 or another suitable mechanism. The second guide trough 108 aids in the removing and installing the duct rod 70 and fiber optic cable or conduit 8 into the pressurized gas pipeline 10. A cross-sectional view of the second guide trough 108 is shown in FIG. 4. The second guide through 108 is preferably coated with a low friction polymer coating such as TEFLON. As shown in FIG. 2, a second corner shield 110 is also shown in the deployed state. The second corner shield 110 helps prevent the duct rod 70 and fiber optic cable or conduit 8 from getting stuck or being abraded or cut during installation. Preferably, the second corner shield 110 is also coated with a low friction polymer such as TEFLON. Teflon coating the guide trough and corner shields reduces drag when installing cable, conduit or rod.

The guide troughs support the cable, conduit or rod to prevent kinks at the infeed end. They centralize and guide the cable, conduit or rod on the outfeed end. The corner shields protect the cable, conduit, or rod from abrasion and gouging caused by the rough machined edges of the drilled holes.

With reference to FIGS. 2 and 3, showing the system installed, in an overview of the method of introducing the fiber optic conduit 8 into the pressurized gas pipeline 10, generally the duct rod 70 is initially introduced into the pressurized gas pipeline 10 via an entry port in the first access or drilling fitting 18. The entry port preferably extends through the gland 22 and the first removable packing gland 50. However, the entry port can also include just the entry gland 22.

After the corner shields and troughs (if used) are deployed within the first air lock housing 30, the duct rod 70 is advanced through the pressurized gas pipeline 10. Corner shields and troughs are optionally also deployed and removed in the second air lock housing 100. The duct rod 70 then exits the pressurized gas pipeline 10 via an exit port in the second drilling fitting 80. The exit port preferably includes the exit gland 84 and the second removable packing gland 114. However, the exit port can include just the exit gland 84. A fiber optic cable or conduit 8 is then attached to the end of the duct rod 70. The duct rod 70 and the fiber optic conduit 8 are then pulled back through and out of the pressurized gas pipeline 10. The duct rod is preferably rewound onto a spool for reuse at the next segment of pipeline. The conduit can be joined to the next adjacent segment of conduit or left open for customer connection once a fiber optic cable is installed within the conduit using conventional installation techniques. With conduit installed and sealed at both ends, cable can be installed at a later date when convenient.

Turning now in detail to the system and methods of the invention, the installation begins by attaching (e.g., welding) the first drilling fitting 18 to the pressurized gas pipeline 10. The first removable packing gland 50 is installed in the entry gland 22. The leading end of the duct rod 70 is then inserted into the first removable packing gland 50 and the entry gland 22 to aid in sealing off pressurized gas. A drilling machine designed for drilling operations under gas pressure, such as a Mueller C-136, E-5 or similar drilling machine, is attached, e.g., bolted and sealed onto the drilling fitting. The pressurized gas pipeline 10 is then drilled via a drilling or cutting machine 251 (shown installed in FIG. 6). This drilling is preferably done at right angle to the pipeline. The slug is removed from the pressurized gas pipeline 10 and the first drilling fitting 18 is sealed with the first completion plug 26. The first air lock housing 30 is then mounted to the first drilling fitting 18 via bolts 32. Use of drilling fittings and drilling machines on pressurized pipelines is well known. Other commonly known techniques for creating an opening into the pipeline may also be used.

Using the viewing ports 36, an operator then uses the first manipulator 34 to substantially equalized the pressure in the first air lock housing 30 with the pressurized gas pipeline 10. The first completion plug 26 is removed and stored within the first air lock housing 30 via the manipulator 34. Next, the first guide trough 38 is deployed using the first manipulator 34. The first guide trough 38 is mounted to the studs 19. The end of the duct rod 70 is slowly fed into the fitting 18. The guide ball 42 is attached on the end of the duct rod 70 via the first manipulator 34. The guide ball 42 and the duct rod 70 are then pushed down the first guide trough 38 and through the pressurized gas pipeline 10. The first driving mechanism 60 provides the force needed to push the duct rod 70 and guide ball 42 along the pressurized gas pipeline 10. A dry lubricant may be added to the exterior of the duct rod 70 before it enters gland 50. Gas leakage is minimized by the glands and seals.

The second air lock housing 100 is installed in a similar manner as described above for the first air lock housing 30. The second drilling fitting 80 is attached to the pressurized gas pipeline 10. The second removable packing gland 114 is installed in the exit gland 84. A short piece of duct rod 70 is then inserted into the second removable packing gland 114 and secured to aid in sealing off the pressurized gas. The pressurized gas pipeline 10 is then drilled or otherwise opened up within the second drilling fitting 80. The slug is removed from the pressurized gas pipeline 10 and the second drilling fitting 80 is sealed with the second completion plug 90. The second air lock housing 100 is then mounted to the second drilling fitting 80 via bolts 102.

Using the viewing ports 106, an operator then uses the second manipulator 104 to substantially equalize the pressure in the second air lock housing 100 with the pressurized gas pipeline 10. The second completion plug 90 is removed and stored within the second air lock housing 100 via the manipulator 104. Next, the second guide trough 108 is deployed using the second manipulator 104. The second guide trough 108 is mounted on studs 92. The second air lock housing 100 can be installed on the pressurized gas pipeline 10 either before, after, or during the installation of the first air lock housing 30.

The shape of the second guide trough 108, as shown, for example in FIG. 4, leads the advancing guide ball 42 and duct rod 70 into the second drilling fitting 80. The first guide trough 38 may also have this same profile. When the guide attachment 42 is part way up the second guide trough 108, the operator uses the second manipulator 104 to remove the guide attachment 42 and store the guide attachment 42 in the second air lock housing 100. The end of the duct rod 70 is then slowly advanced into the exit gland 84, if necessary with the help of the second manipulator arms, and pushes out the short piece of duct rod 70 that was sealing the second removable packing gland 114. Split plugs 44, 112 can be inserted from the inside of the first and second drilling fittings 18, 80 via the first and second manipulators 34, 104 to seal the system while the glands are arranged to pull the duct rod 70 and/or fiber optic conduit 8 through the pressurized gas pipeline 10.

With the duct rod 70 now pushed outside the exit gland 84, the fiber optic cable or conduit 8 is connected to the end of the duct rod 70, preferably via a cable grip 126 attached to the end of the duct rod 70. Once the duct rod 70 and the cable grip 126 are connected, the split plugs 112 are removed via the second manipulator 104. The first driving mechanism 60 then reverses direction and begins to pull the duct rod 70 and fiber optic conduit 8 back through the pressurized gas pipeline 10. At the same time, the second driving mechanism 124 feeds the fiber optic conduit 8 into the guide duct 120. The duct rod 70 is pulled at the same speed that the fiber optic conduit 8 is fed into the pressurized gas pipeline 10. A lubricant may be added to the exterior of the fiber optic conduit 8.

Alternatively, the duct rod at the entry can be pulled through to the end of its roll, and the fiber optic cable or conduit attached at the entry and pulled through the pipe from that point to the exit location. This approach allows the rod to be coiled at the exit location and be closely located to the next pipeline segment entry location. This facilitates multiple segment installations.

The first removable packing gland 50 is then sized to permit passage of the cable grip 126 such that the entry gland 22 (which will now be used as an exit gland since the duct rod 70 and fiber optic conduit 8 are being pulled in the opposing direction) can seal on the exterior of the cable grip 126 and fiber optic conduit 8. The duct rod 70 and fiber optic conduit 8 are then pulled out the first drilling fitting 18 into a final position. Once the duct rod 70 and fiber optic conduit 8 are in the final position, the tapered split plugs 44, 112 are placed into position using the first and second manipulators 34, 104. The first and second removable packing glands 50, 114 are then removed along with any packing material 28 and final split plug seals are installed.

The entry gland 22 and the exit gland seals 84 are finally secured and further sealed via a threaded nut 352 and service head adapter with shield nut 360 (shown in FIG. 15 and described below). The first completion plug 26 and the second completion plug 90 are retrieved and installed in the first and the second drilling fittings 18, 80 using the first and second manipulators 34, 104, respectively. The pressure is reduced in the first air lock housing 30 and second air lock housing 100 and the first and second air lock housings 30, 100 are removed from their respective flanges 20, 82.

The fiber optic conduit 8 containing fiber optic cable is now installed in the pressurized gas pipeline 10. The method and device are capable of installing fiber optic conduit 8 into pressurized gas pipelines 10 without stopping or impeding the flow of natural gas. In this manner, existing pressurized gas pipelines 10 can be installed with fiber optic conduit 8 without disruption in gas service to customers.

In an alternative embodiment of the invention, shown in FIG. 5, the duct rod 70 is replaced with semi-rigid fiber optic or other conduit 8. A bull nose or bullet head 128 may be located on the end of the conduit 8 and allows the fiber optic conduit 8 to be pushed through the glands 22, 84 and pressurized gas pipeline 10 without the need for a separate duct rod 70 or for a rodding gland assembly 50, 118. As with the prior method, the drilling fittings 18, 80 and the first and second air lock housings 30, 100 would also be employed. The guide attachment 42, however, would not be needed. In this aspect of the invention, the fiber optic conduit 8 needs to be sufficiently rigid to permit the snaking of the fiber optic conduit 8 through the pressurized gas pipeline 10 for distances anticipated to be found between customer connection locations in urban environments. For example, the fiber optic conduit 8 can include one or more reinforcing layers wrapped around a central core conduit or, a duct rod can be inserted into the conduit. Alternatively, the fiber optic conduit 8 can be made of a composite polymer that has sufficient rigidity such that the fiber optic conduit 8 can be snaked through the pressurized gas pipeline 10. Pressurizing the conduit with compressed gas is another option for increasing the conduit rigidity.

Figure 6:
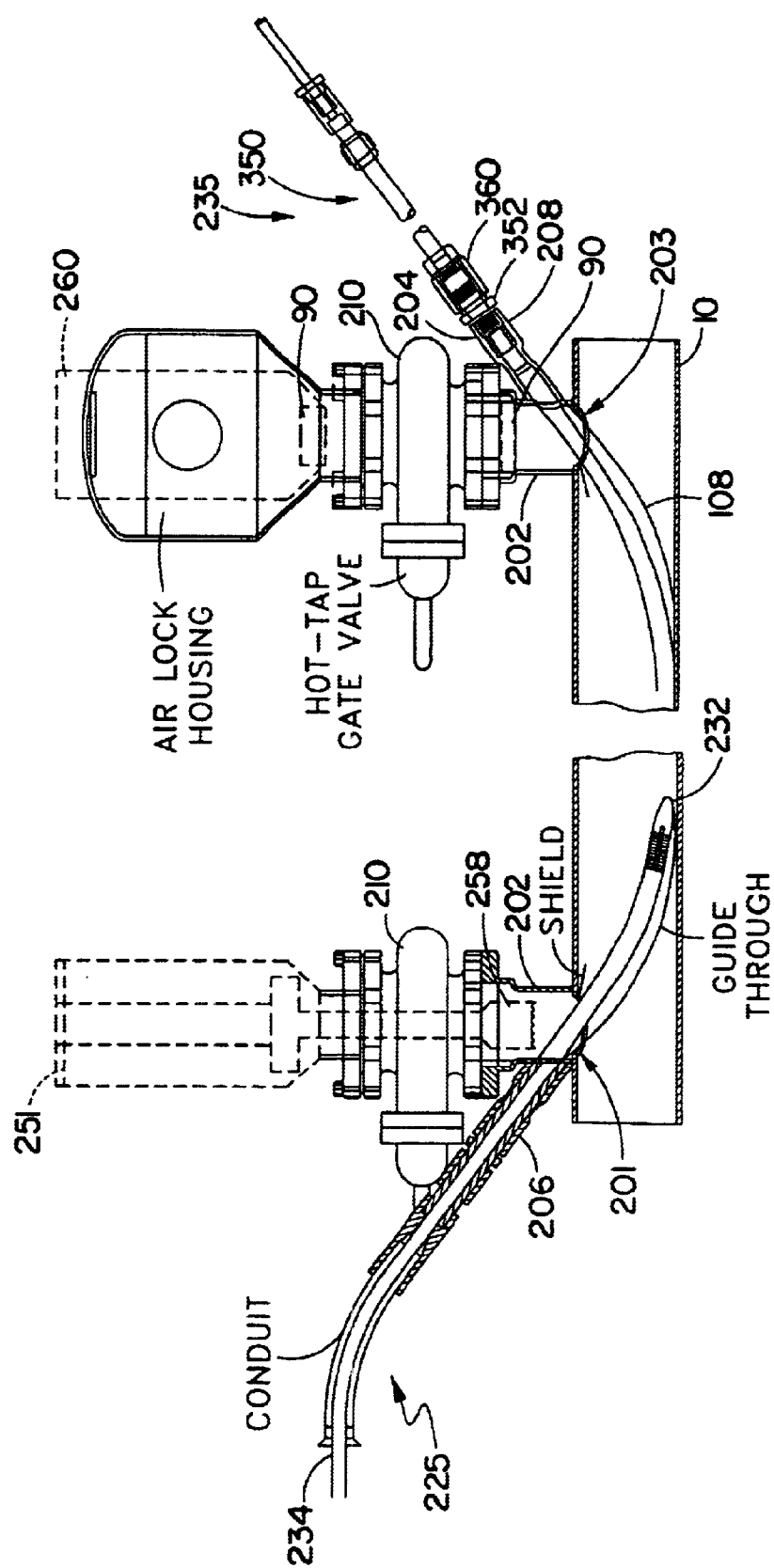
FIG. 6 is a schematic view of an another alternative system and method for installing conduit directly.

Referring now to FIG. 6, in an alternative system and method, standard "hot-tap" drilling fittings or line stopper fittings 202 are modified with a side arm 204 containing packing glands 208 at their outer ends. The fittings 202 are located in position on the gas pipeline 10 and welded in place. In plastic pipe, the plastic access fitting is fused to the pipe using conventional techniques such as electrofusion or heat fusion. A gate valve 210 and drilling machine 251 are attached to the drilling fitting 202. The valve 210 is opened. The drilling machine 251 extends a cutter 253 through the open valve and cuts a hole in the pipeline, within the drilling fitting 202. The cutter 253 is withdrawn back out through the open valve, and the valve is then closed. The drilling machine 251 is then removed (e.g., unbolted) leaving the gate valve in place. The air lock housing 30 is attached to the gate valve and the valve opened, giving access to the pipe through the air lock housing 30.

After the fiber optic cable or conduit installation is complete, the gate valve is closed, the air lock housing removed and a completion or stopping machine 260, such as a Mueller H-17235, E-5 or equivalent, is attached and sealed onto the drilling fitting, preferably via bolts. The completion machine 260 holds the completion plug 26 or 90. The valve is opened and the completion plug 26 or 90 is installed into the upright neck of the drilling fitting and tightened using the completion machine 260. The completion machine 260 and gate valve are removed and a blind flange or threaded cap is installed over the access fitting.

Figure 7:
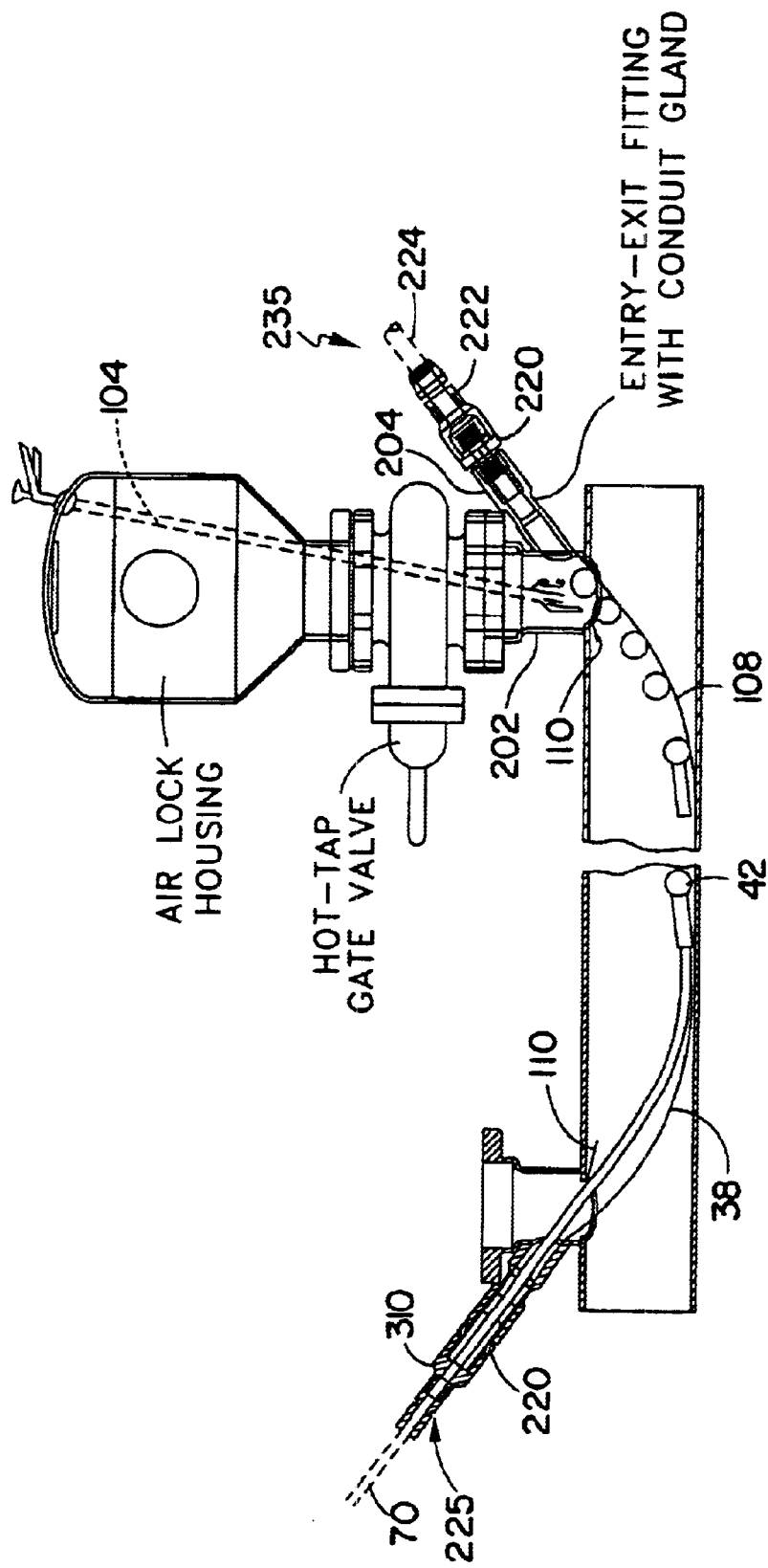
FIG. 7 is a schematic view of another method and system using a guide rod to pull cable or conduit back through a pipeline.

Referring to FIG. 7, when duct rodding is used, the following steps are preferably performed (although each step is not necessarily essential):

1. Before drilling the hole in the pipeline, conduit gland nut 222 or 352 and a rodding adapter gland nut 222 are attached to the entry/exit fitting 204 on the drilling fitting 202. On the infeed end 225, the rod 70 is inserted through the glands, and the rod guide attachment 42 is attached to the rod 70. The rod attachment is retracted into the recess at the inner end of the entry/exit fitting if its size detrimentally blocks the pipe entry hole 203. On the outfeed end 235, a short length of rod 224 is inserted into the rodding adapter 222 to act as a temporary plug.

2. Holes are cut in the pipeline. The air lock housings are attached as explained above.

3. Using the manipulator 34, 104, the guide troughs 38, 108 and corner shields 110 are installed from inside the air lock housings.

4. The rod 70 is pushed until the guide attachment 42 is at the top of the trough 108 at the outlet end 235. Alternatively, if no guide trough is used, the manipulator arms can be used to grasp the guide rod and maneuver it into the exit gland. Using the manipulator 104, the guide ball is removed and the rod is guided into the entry/exit fitting 204.

Alternatively, the duct rod 70 is attached to the short piece of duct rod that was pre-installed in the exit gland. Once attached, the pre-installed rod piece 224 can be used to pull the duct rod 70 through the exit. In some applications, the duct rod or conduit may be snaked or driven through by hand, especially on shorter runs.

5. The rod is pushed through the glands, pushing out the plug 224.

6. By attaching a fiber optic or other type cable or a conduit to either end of the rod, installation can proceed with forward or backward direction by pushing and/or puling the duct rod.

7. Split rubber plugs can be installed in the recesses at the inner ends of the entry/exit fittings using the manipulator to control leaking until the proper seal packing is installed in the glands.

8. Completion plugs area installed. The air lock housings and valves are removed, as explained above.

Figure 8:
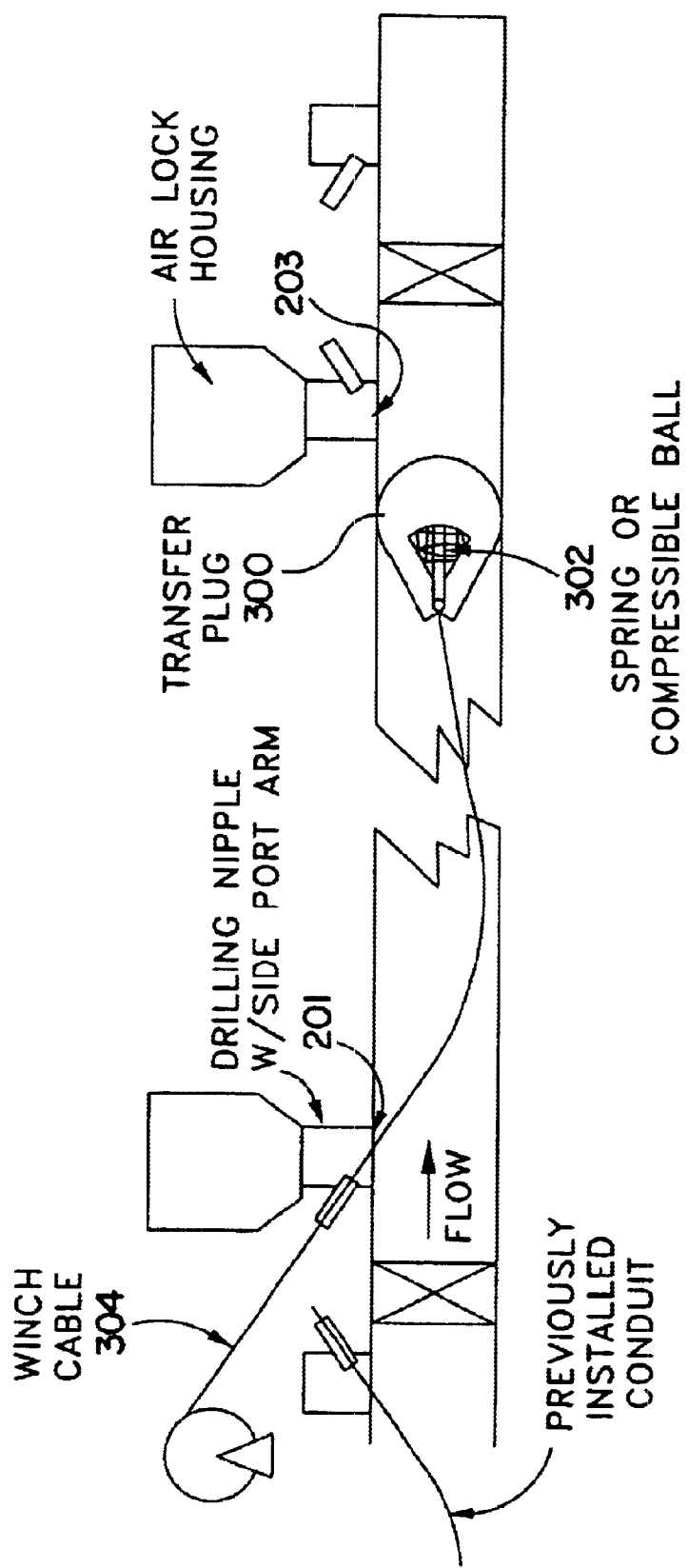
FIG. 8 is a schematic diagram of a transfer plug embodiment.

In place of the driving apparatus 60 and 124, in an alternative design shown in FIG. 8, a transfer plug 300 is installed into and removed from the pipeline via the air lock housings. The transfer plug 300 has a spring-like frame 302 which causes it to pop open after it is pushed through the entrance hole 201 cut into the pipeline. Alternatively, the transfer plug can be constructed with a solid, compressible core with a "memory" shape similar to the pipeline cross section. Preferably, the parachute has a diameter just slightly less than the pipeline diameter. A draw cable, rope, or wire 304 is attached to the transfer plug 300. The gas flowing through the pipe carries or blows the parachute 300 from the first drilling fitting to the second drilling fitting, where it is extracted through the exit hole 203, using the manipulator. The draw cable 304 is separated from the transfer plug and is pulled through the exit glands using an extractor hook on the end of a piece of duct rod 70. The back end of the draw wire 304 is attached to a cable or conduit. By pulling on the draw wire 304, the cable or conduit is pulled through the pipeline. Hence no duct rod is needed to route the conduit through the pipeline in this embodiment. In certain applications, compressed gas, such as nitrogen or air, may be used to blow the transfer plug 300 through the pipeline, instead of the gas. In routing or passing conduit through the pipeline, the conduit may be stiffened, by filling it with compressed gas, or by placing a stiffening element or material in the conduit. The stiffened conduit is easier to route.

FIGS. 9–12 show an alternative design having an end plug 250 having grip rings 252 which secure it into the open end of a conduit 254. The end plug 250 preferably also has a spherical end nose 256, a coupler groove 258, a conical guide collar 260, and a neck 262, as shown in FIG. 13. A manipulator 270 on a fitting 271 attached to the pipeline has a hand 272 adapted to close around the neck 262. The hand 272 is supported on an armature 274 attached to the lower end of the manipulator 270 at a pivot joint 276. A linkage 278 on the armature 274 extends up through or near the armature 274, so that the hand 272 can be pivoted up at an angle, as shown in FIG. 12, by controlling the manipulator handles, outside of the air lock.

Referring now also to FIGS. 13 and 14, a coupler 300 is positioned into a neck 302 of the fitting 271. The coupler has a receptacle 304 adapted to couple onto the end plug 250. The receptacle has ball bearings 306 engaging a groove in the receptable. The receptacle has a conical guide 308 adapted to cooperate with the guide collar 260, to guide the groove 258 into engagement with the ball bearings 306. The receptacle 304 is slidably positioned within a collar 310. An insert 312 within the receptacle is biased forward by a spring 313. A further description of the coupler 300 is provided below with reference to FIG. 41.

In use, the end plug 250 is maneuvered into position under the manipulator 270. The neck 262 is grabbed by the hand 272, as shown in FIG. 10. Using the linkage 278, the end plug 250 and attached conduit is tilted up into alignment with the coupler 300 in the neck 302. The collar 310 and receptacle 304 is pushed into engagement with the end plug 250. The ball bearings 306 move into the groove as the insert 312 moves back against the spring force. The end plug 250 and attached conduit can then be pulled out of the neck 302 by pulling on the extractor segment.

Referring to FIGS. 6 and 9–15, if conduit is to be installed directly, the following steps are preferably performed (although each step is not necessarily essential):

1. Before drilling the hole in the pipeline, the conduit gland nut 220 is attached to the entry/exit fitting. The conduit nose fitting 250 is installed on the end of the conduit 254 and pushed into the conduit gland to seal it. A coupler 300, as shown in FIGS. 9 and 13, is inserted into the exit port gland 204 and gland nut 220, shown in FIG. 6.

2. The valve is attached, the hole is drilled in the pipeline, and the air lock housing is attached as explained above.

3. Using the manipulator 270, the corner shields 400 are installed into the pipeline from inside the air lock housing, as shown in FIG. 19.

4. The conduit 254 is pushed through until the nose fitting 250 is reachable by manipulator arm 270 at the exit end 235. The manipulator 270 is used to attach the nose fitting 250 to the coupler 300. FIG. 9 shows detailed examples of the manipulator, nose fitting and coupler fittings and how they function as a system.

5. The coupler 300 is used to pull the conduit 254 through the exit gland 204 and gland nut 220

6. A completion plug is installed. The air lock housing and valves are removed as explained above.

7. The conduit 234 is now sealed to the pipeline 10 using a modified service head adapter with shield nut 360, but the interior of the conduit is still open. After the cable is installed in the conduit, it is preferably sealed to the conduit, either at the entry/exit fitting or at a remote end of the conduit. An assembly of appropriate glands will provide the seal in either case.

The guide troughs, guide ball, and corner shields may be omitted or replaced with functional equivalents.

Figure 15:
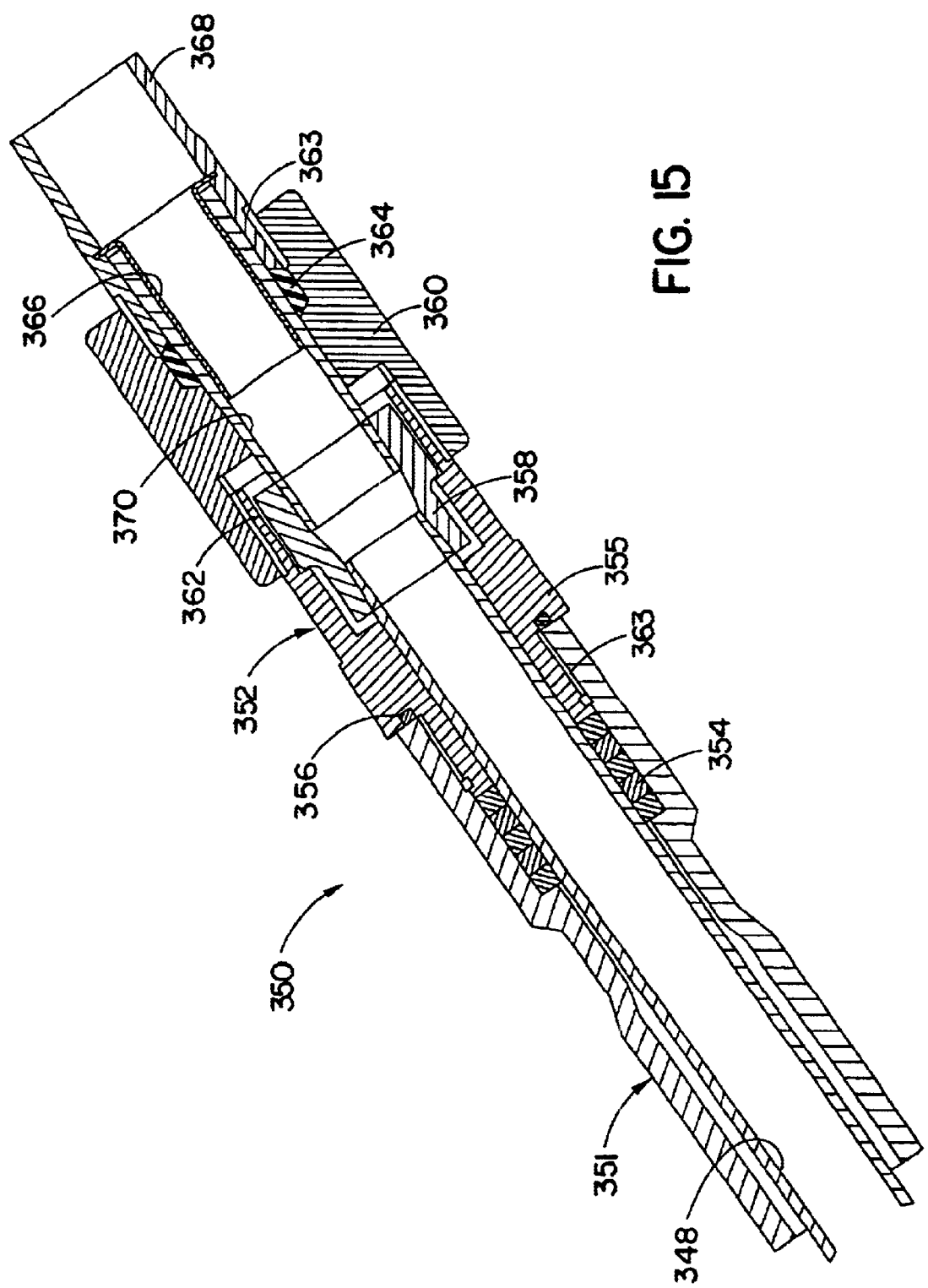
FIG. 15 is a section view of a sealing assembly for sealing a conduit after it is pulled or routed through a pipeline.

Turning to FIG. 15, a conduit or other lumen 348 is sealed within a side arm 350 of a pipeline fitting, to prevent escape of pressurized gas. As shown in FIG. 15, a gland nut 352 is threaded into the side arm 350 via machine threads 363. An O-ring 356 at a shoulder 355 on the gland nut 352, and a packing assembly 354 within the side arm 350, provide a pressure tight seal between the gland nut 352 and the side arm 350. The packing assembly 354 also seals against the outside diameter of the conduit 348. The packing assembly includes a stack up of washers, packings, and split opposite packings.

A shield nut 360 is attached to the gland nut 352 via pipe threads 362. A fusion socket reducer 358 surrounds the outside diameter of the conduit 348, within the gland nut 352 and shield nut 360. A service head adapter 368 is threaded into the outer end of the shield nut 360, and is sealed against the shield nut 360 by an annular rubber seal 364. The service head adapter is a gas pipeline industry fitting used to seal plastic to metal. A pipe section 370 extends from the pipe section 368, through the shield nut 360 and into the fusion socket reducer 358. A pipe section stiffener 366 is provided within the pipe section 370.

With the design shown in FIG. 15, a pressure tight seal is formed around the conduit 348, without constricting the internal diameter or lumen of the conduit 348. This allows for sufficient installation of fiber cable into the conduit using compressed air.

Turning now to FIGS. 16–19, a corner shield 400 has a pair of arms 402 extending outwardly at an angle from a center clip 408. Each of the arms 402 has a top flange 404 and a side flange 406. A flanged rivet 410 is attached to the clip 408. The clip 408 is adapted to clip onto the edge of a drilled pipeline, as shown in FIG. 19. The flanged rivet 410 is adapted to be grabbed by a hand of a manipulator, such as the hand 272 of the manipulator 270 shown in FIGS. 9–12.

In use, the corner shield 400 is preferably attached or picked up by the manipulator before the air lock housing is installed. The manipulator 270 picks up the corner shield 400 by engaging or grabbing onto the flanged rivet 410 using the manipulator hand, such as the hand 272. The corner shield 400 is then installed onto the edge of the opening, as shown in FIG. 19, using the manipulator 270. The arms 404 hold the corner shield 400 onto the pipeline, via spring force. The corner shield 400 prevents the cable or conduit moving into or out of the pipeline from chaffing or scrapping on the opening drilled into the pipeline.

While the system is preferably used on pipelines of about 5 cm or larger, it may also be used on smaller lines, with modified access fittings.

The system and methods may also be used with other types of pressurized pipelines, including pipelines carrying liquids, with appropriate modifications of the seals and glands.

Multiple, interchangeable packing glands allow use of the same entry/exit fitting with many sizes of cable, conduit or rod.

Multiple layers of split packing materials allow changing seals with the cable, conduit, or rod in place.

The duct rod or conduit (with or without stiffening devices) acts as a translating member, i.e., an element that is moved through the pipeline.

Nominal gas leakage may of course occur in using the present system and methods, without affecting the advantageous results. The description herein of sealing, seals, pressure tightness, etc. and steps performed without allowing gas to escape, of course contemplate and include situations where nominal leakage occurs.

If suitably strong manipulators are used, the gate valve is not needed and the air lock housing can be mounted directly to the drilling fitting, as shown in FIGS. 2 and 3. After equalizing pressure, the completion plug could be removed with the manipulator and stored inside the air lock housing.

The attachment of components described above are made pressure-tight, to prevent gas from escaping form the pipeline, using known seals, components and methods, except as specified.

Figure 20:
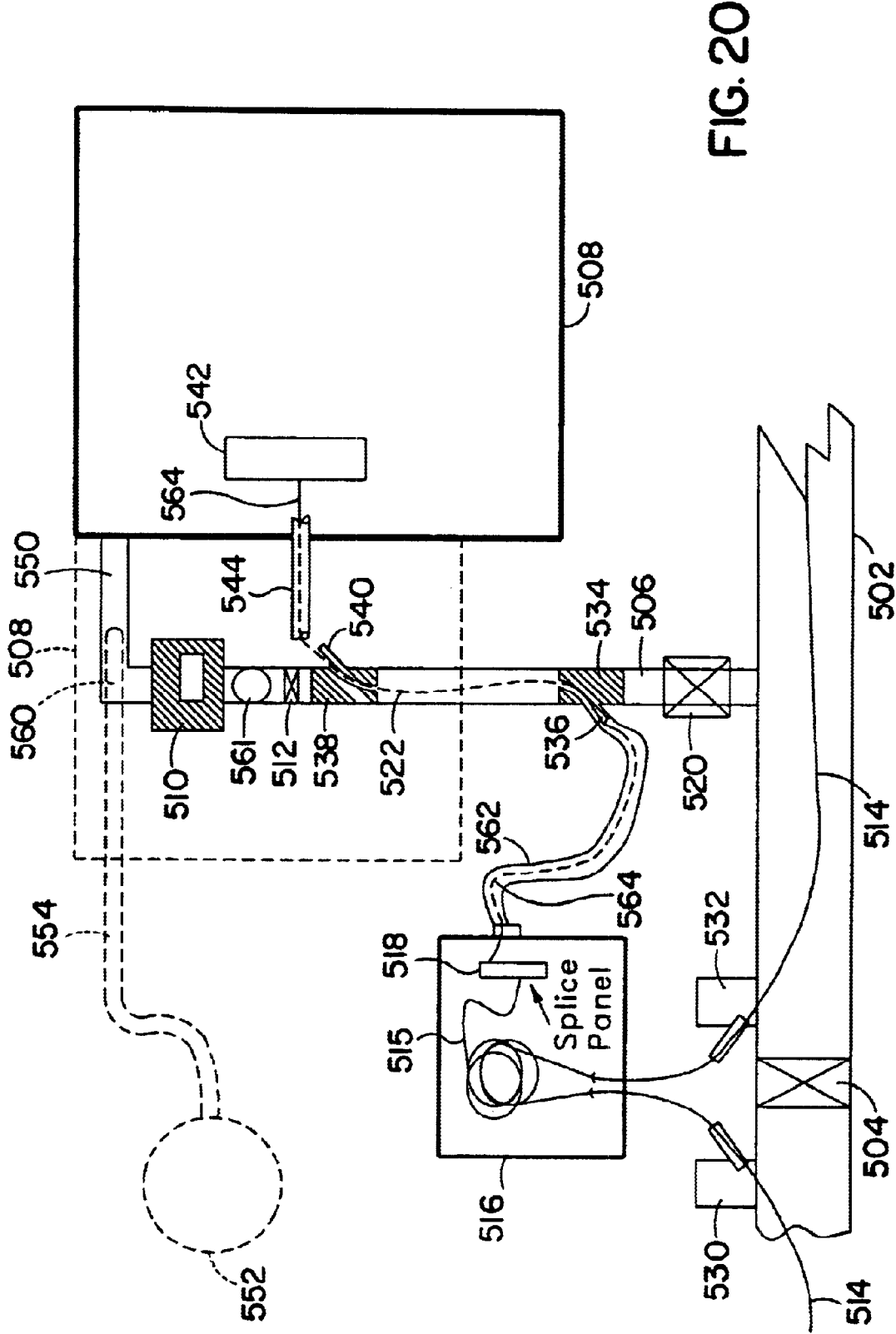
FIG. 20 is a schematic drawing of a service line conduit installation method.

FIG. 20 illustrates a method for connecting a cable or conduit running through a gas pipeline or main into a building. As shown in FIG. 20. A cable or conduit 514 is routed through a pipeline 502 as described above with reference to FIGS. 1–12. The cable 514 is withdrawn or routed out of the pipeline 502 at an outlet port 530, through a junction box or vault 516, and then back into the pipeline 502 at a return port 532. The outlet and return ports, and the methods for routing through them, may be as described above with reference to FIGS. 1–3, 5, 9–12 and 15. A patch line 515, which may be one or more optical fiber strands, from the cable 514 is connected into a splice panel or splice connector 518, within the junction box 516. A branch line cable 522 is routed from the splice panel 518 to a natural gas or other utility service line 506. The service line 506 is a pipe connecting from the main pipeline-502 into a building 508.

To route the branch line cable 522 into the building 508, the gas supply through the service line 506 is temporarily bypassed. This bypassing is preferably achieved by connecting a temporary gas supply 552 to the customer houseline or customer line inlet 550, via a temporary hose 554 equipped with standard bypass fitting 560. The temporary gas supply 552 can be from a portable tank of gas or from another pipeline source. If a temporary gas supply 552 is used, it preferably contains enough gas to continuously supply gas to the building 508, during the cable installation procedure.

After the temporary gas supply 552 is connected, the service line 506 is isolated by closing the normally open service line valve 520 or using a variety of other conventionally available gas control techniques, such as temporary line pinching. The bypass fitting 560 prevents gas from flowing backwards to the meter and into the service line. This shuts off supply of gas from the main 502 into the service line 506, and also isolates the meter 510 and the temporary supply line 554 and/or the building inlet 550 from the service line. Gas supply to the building 508 continues via the temporary gas supply 552. In some applications where interrupting the gas supply to the building for a short time is acceptable, installation and use of the temporary gas supply may be omitted. The meter 510, valve 512, regulator 561 and inlet 550 may be located inside of the building, as shown in dotted lines in FIG. 20.

Gas in the service line between the valves 520 and 512 is removed and replaced with an inert gas such as nitrogen. This is typically achieved by "blowing down" the service line. The service line is vented to the atmosphere and compressed inert gas is injected or blown into the service line, to purge the natural gas out of the service line 506.

First and second access fittings 534 and 538 are then installed into the service line 506. As this procedure is performed with the service line de-pressurized, purged with nitrogen or another inert gas, and then filled with air, no special containment techniques are needed. The service line 506 is cut near the junction box 516 or the valve 520 to install the first access fitting 534. The service line is also cut near the valve 512 or at another location near the building 508, to install the second access fitting 538. The second fitting 538 is typically installed in place of the original valve 512 location. The valve 512 is then re-installed down stream of the second fitting. Alternatively, the second fitting 538 can be installed below ground in a vault.

A building access conduit or duct 544 is installed extending from the building 508 to near or into the second fitting 538. The access conduit 544 typically is installed in the basement of the building 508 and runs out from under the building to the access fitting 538 on the meter-set-assembly riser pipe location adjacent to the building 508. Alternatively, when the access fitting 540 is located in a vault below ground, the access conduit 544 will connect at that location.

A service line access conduit 562 is routed from the junction box 516, typically via a bore hole, to the entry access fitting 534. The service line conduit 522 is then routed, by hand or by use of a duct shuttle, from the termination of the service line access conduit 562 into the service line 506 via the side branch 536 of the first access fitting 534. The service line conduit 522 is then further routed, also preferably by hand or duct shuttle, out of the service line 506, via the side branch 540 of the second access fitting 538. The service line conduit 522 is then sealed to the service line access fitting side branches 536 and 540 with gas-tight seals, preferably electro-fusion reducer couplings 563. Alternative seals, such as glands, pressure fittings, etc., may also be used. Optical fiber cable 564 is then installed through the service line access conduit 562, the service line conduit 522 within service line 506, and the building access conduit 544. Water, dust and air seals are placed in both ends of the service line access conduit 562, the service line conduit 522, and the building access conduit 544. The fiber cable is then spliced to the splice panel 518 and to the building telecommunication distribution junction panel 542.

Various telecommunication devices within the building 508, such as personal computers, data servers, telephones, etc. are connected to the branch line cable 564 via electronics. The connection between such devices in the building 508 and the trunk optical fiber cable 514 in the gas main 502 is now complete. Alternatively, the trunk cable can be installed via any host of traditional methods, including via direct burial in conduit.

Service line 506 is tested for leaks, and air, if present, is purged out of the service line with an inert gas, after which natural gas is introduced by opening valve 520 or releasing any applicable pinch closure. Once the line is purged of any inert gas, the bypass fitting 560 is removed and the bypass access nut re-installed. Any excavation created around fittings 534 and 538, is filled in. The entire installation is now complete. This method is advantageous as it provides a relatively simple, fast and inexpensive way to provide telecommunication services via a cable in gas pipelines. The delays, costs, and inconvenience of extensive excavation for routing cables is avoided. Use of the access conduit 562 may be omitted.

Figure 22:
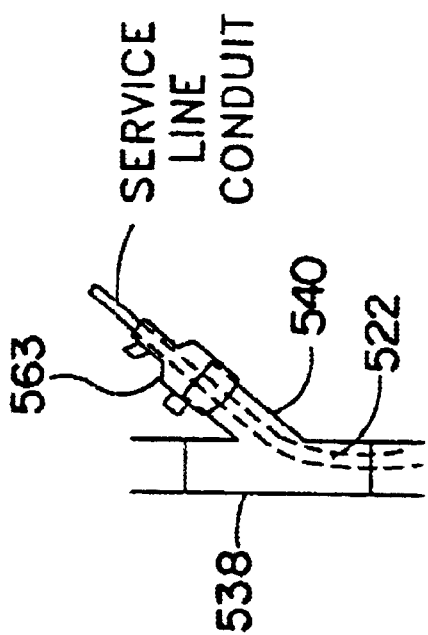
FIG. 22 is a detail of a fitting shown in FIG. 20.
Figure 21:
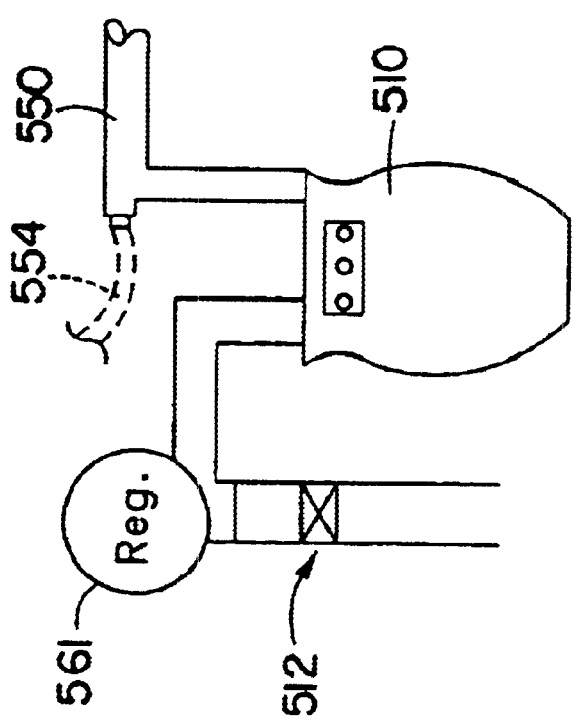
FIG. 21 is a detail view of the regulator and meter shown in FIG. 20.

FIG. 21 better shows the typical positions of the meter 510, regulator 561, and the customer houseline 550. FIG. 22 shows an electro-fusion reducer coupling 563 on the side branch 540 of the fitting 538. Other types of seal fittings may also be used. Dust/water plugs 565 are installed in the bridge conduit 544.

An alternative technique for pulling conduit or cable through a pipeline uses a sail, as shown in FIGS. 23–30. With this technique, a sail or parachute is pushed through the pipeline via the gas flowing in the pipeline. The parachute or sail, however, does not make a complete seal against the inside walls of the pipeline. Consequently, gas flows past the sail, ensuring that gas flow is not stopped or decreased sufficiently to adversely affect downstream gas customers or users. The specific design details of the sail and the amount of clearance between the sail and pipeline inside wall, to allow gas flow past the sail, may be adjusted depending on parameters such as gas pressure, slow velocity, pipeline diameter, drag force needed to pull the heaving line, etc. Preferably, the sail assembly is lightweight, so that the sail may be moved through the pipeline via gas pressure, while causing a minimized pressure drum or interference with gas flow through the pipeline, even with relatively low flow velocity or pressure differential (e.g., 0.1–5 meters/sec) conditions found in distribution pipe systems. Incorporation of pressure relief valves 633 into the sail or sail cap will further ensure that the sail assembly will not significantly impede gas flow. If necessary, the operator can collapse the said by pulling on the heaving line.

Turning now to FIG. 23, a sail system 600 has a tail plug 604 attached to the back or trailing end of a sail tube 602. A heaving line 610 is attached to the tail plug 604. A sail assembly 606 is provided at the front or leading end of the sail tube 602. The sail assembly 606 includes a plurality (preferably 8) sail ribs 612 pivotably attached to a sail cap 608. The sail ribs 612 are spring biased outwardly, driving the sail assembly 606 into a deployed or extended position. Sail rib lines or the sail cloth itself 630 attached to the outer ends of each of the sail ribs 612 are used to retract or collapse the sail.

Turning to FIGS. 25–30, sail gores or sectors 636 are attached to each other to form a sail cover 614 secured to the ribs 612. A leach line 634 extends around the circumference or perimeter of the sail cover 614. The leach line 634 limits the maximum extended position or diameter of the sail assembly 606 in the deployed position.

Referring momentarily to FIGS. 26 and 27, a cap spring 616 on the sail cap 608 pushes on the inside ends of the sail ribs 612, causing the ribs to pivot outwardly. The sail ribs 612 may optionally come to a hard stop against a surface of the sail cap 608, to limit the extended position of the sail ribs 612 and the sail assembly 606, in addition to, or instead of, limiting extension of the sail assembly 606 via the leach line 634. The sail cap 608 has a fork slot 618, adapted to be engaged by a manipulator, such as shown, for example, in FIGS. 10–12.

The outside ends 620 of the ribs 612 are curved, to allow the sail assembly 606 to slide smoothly forward through the pipeline 10. The ribs 612 are also preferably flexible, and made of a plastic material, e.g., Teflon. This helps to avoid damage during entry and exit.

Referring to FIG. 25, the rib lines 630 are attached to a slide plug 628 slidably positioned within the sail tube 602. A sail line 632 coaxial to heaving line 610 is attached to the slide plug 628. A sail cap rod 622 extends outwardly from the slide plug 628 and is attached to the sail cap 608, to support the sail assembly 606, in a position nominally coaxial with the sail tube 602. A front stop 638 at the front end of the sail tube 608 prevents the slide plug 628 from moving out of the front end of the sail tube 602. Alternatively, the front stop 638 can be removed so that the sail is allowed to open fully into a concave shape in the direction of gas flow. This increases the gas drive pressure for a given sail design In use, the sail system 600 works in a way somewhat similar to the system shown in FIG. 8. Preferably, the sail tube, sail cap and tail plug 604 are dimensioned to allow the sail system 600 to be used with the same components and fittings as shown e.g., in FIGS. 5, 6, and 15. The sail system 600 is initially in a retracted or undeployed position. The slide plug 628 is pulled back, to position AA, shown in FIG. 25. The sail assembly 606 is folded or retracted. The folded ribs 612 are held against or near the front end of the sail tube 608. The sail cap 608 is introduced into the pressurized pipeline 10 through a side arm, such as side arm 351 in FIG. 15. Once inside the pipeline 10, tension on the sail line 632 is released. The cap spring 616 pushes the sail ribs 612 outwardly, causing the sail assembly 606 to deploy. The ribs 612 move from the retracted or folded position CC shown in FIG. 23, to the deployed or extended position DD shown in FIGS. 23 and 25. As shown in FIG. 28, when deployed or extended, the sail assembly resembles an inverted umbrella.

Turning momentarily to FIGS. 47 and 48 a stuffer tool 865 is used to install and remove the sail assembly. The stuffer tool 865 inserts the folded sail assembly into the pipeline through the seals in the side arm. The heave line 610 extends through a bore in a stuffer tube 867. (The heave line is routed through the bore before attaching it to the sail assembly). A gland nut 869, stuffer seal housing 871, packing rings 873 and compression nut 875 and optionally the sail assembly are installed on the side arm before an opening is cut into the pipeline. With the tail plug 604 engaged into the end of stuffer tube 867, the sail assembly is pushed through the side arm and into the pipeline. Guide rollers 877 at the end of the stuffer tube 867 reduce friction as the heave line moves in or out. A T-handle 879 on the stuffer tube 867 is turned and held under a collar flange 881, to hold the guide rollers 877 at the end of the stuffer tube at a position near the center of the pipeline. A stopping lip 883 on the stuffer tube 867 prevents gas pressure in the pipeline from pushing the stuffer tube 867 out of the seal housing 871.

Referring to FIG. 29, the sail assembly 606 occupies a majority of the cross section of the pipeline. However, it does not seal against the pipeline. Rather, sufficient clearance or space remains between the inside surface of the pipeline 10 and the sail assembly 606, to allow gas to flow past the sail assembly 606. Typically, the clearance space will be from 1–5 or 10% of the cross section area of the pipe for flow rates less than 1, 2 or 3 meters/sec. The pressure of the gas within the pipeline 10 pushes the sail assembly 606 forward. The curved outer ends of the ribs 620 may slide or intermittently bump against inside surfaces of the pipeline 10. If an obstruction within the pipeline is encountered, the ribs 612 may flex and deflect, to allow the sail assembly 606 to pass by the obstruction. Additionally, one or more of the ribs 612 may be partially collapsed inwardly, against the force of the cap spring 616, until the sail assembly 606 moves past the obstruction. This clearance is small enough to create sufficient pressure differential to move the sail assembly and heave line along through the pipeline As the sail assembly 606 moves through the pipeline 10, it pulls the heaving line 610 along. The heaving line passes through a low friction seal 877 in the stuffing tube 867. When the sail assembly 606 reaches an exit point, such as a second access fitting 80, or other pipeline fitting, the sail cap 608 is engaged and held by a manipulator, as described above. The sail line 632 is tensioned. The slide plug 628 is pulled back from the deployed position BB, to the retracted position AA, shown in FIG. 25. The rib line 630 correspondingly pull the ribs inwardly to the collapsed or retracted position CC, shown in FIG. 23. The sail assembly 606 is then collapsed so that it fits within a diameter equal to, or smaller than the sail tube 602. The sail assembly 606 is then withdrawn from the pipeline, as described above. The heaving line 610 is detached from the tail plug 604. A conduit or cable is then attached to the heaving line 610, and can be pulled back through the pipeline. Alternatively, the cap 608 can be coupled to a conduit via the conduit coupler 750 shown in FIG. 41 which has been previously positioned in the access fitting 80. The heaving line is then used to pull the conduit and sail assembly back through the pipe to the other access fitting 80 where a manipulator is used to grab the tail plug 604 and position it for extraction from the pipeline access fitting 80.

Figure 31:
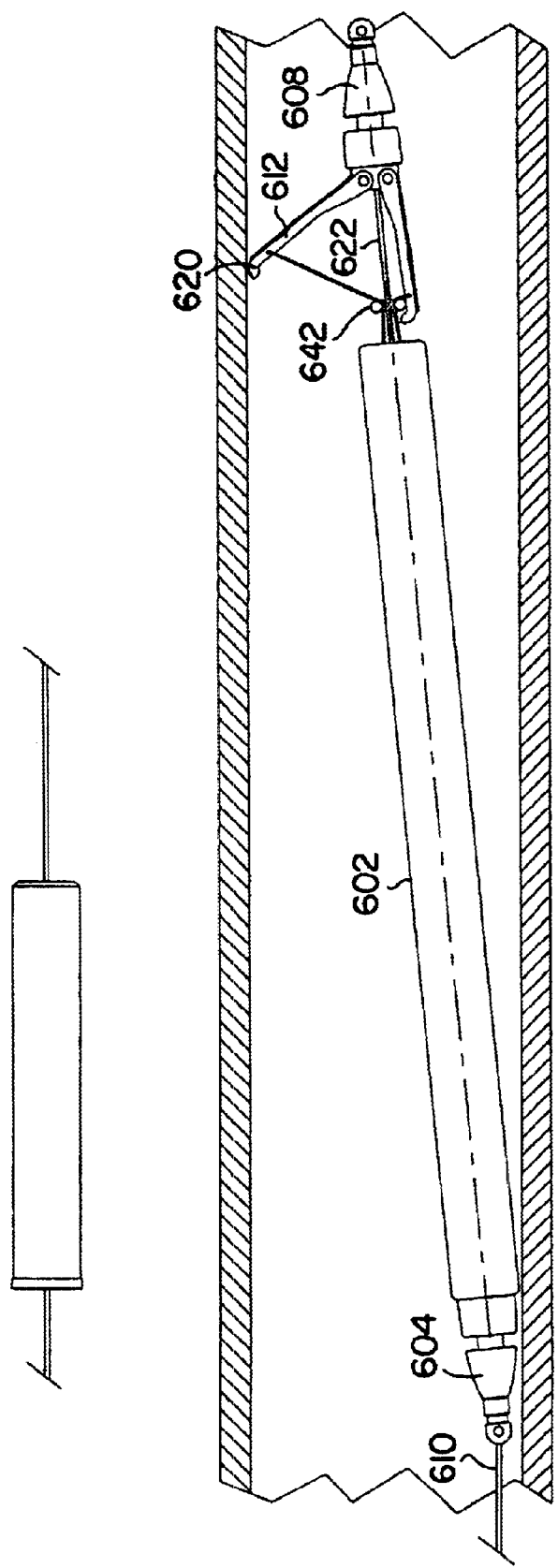
FIG. 31 is a side view of an alternative sail assembly.

FIG. 31 shows an alternative sail system 640 having rollers 642 on the sail cap rod 622. The rollers 642 prevent the sail lines 632 from rubbing against the front end of the sail tube 602.

FIG. 24 shows the sail system 600 as typically deployed. FIGS. 23 and 25 show a sail rib 612 partially or fully retracted or closed, for purpose of illustration only. As shown in FIG. 29, the sail assembly 606 preferably forms an octagon. However, other shapes may also be used by changing the number of ribs 612 used in the sail assembly 606 and the shape of the sail cloth. While the sail assembly 606, when deployed, may not form a circle or circumference, because the outer edges of the gores or sectors 636 are straight edges, the parameter of the sail cloth 614 or sail assembly 606 is referred to as a circumference, for purposes of description. However, a circular sail assembly may also be used.

A significant advantage of the sail systems shown in FIGS. 24 and 31 is that they are used within most of the same tools and fittings provided for the other systems described above, for installation, routing through the pipeline, extraction, and sealing. In many applications, a pressure differential lower than 1 psig can move the sail at a reasonable speed. However, the sail system can provide only nominal pulling force. Consequently, the sail assembly, heave or pull back line must be lightweight. In addition, the heave line seal must be a low friction seal, to avoid excessively braking the sail assembly. The sail assembly can only pull a leave line. Unlike liquid pipeline drogues, the sail assembly cannot pull a cable or conduit. Consequently, it is used in pull back or pull through method, rather than in a direct routing method as in liquid pipelines.

Figure 32:
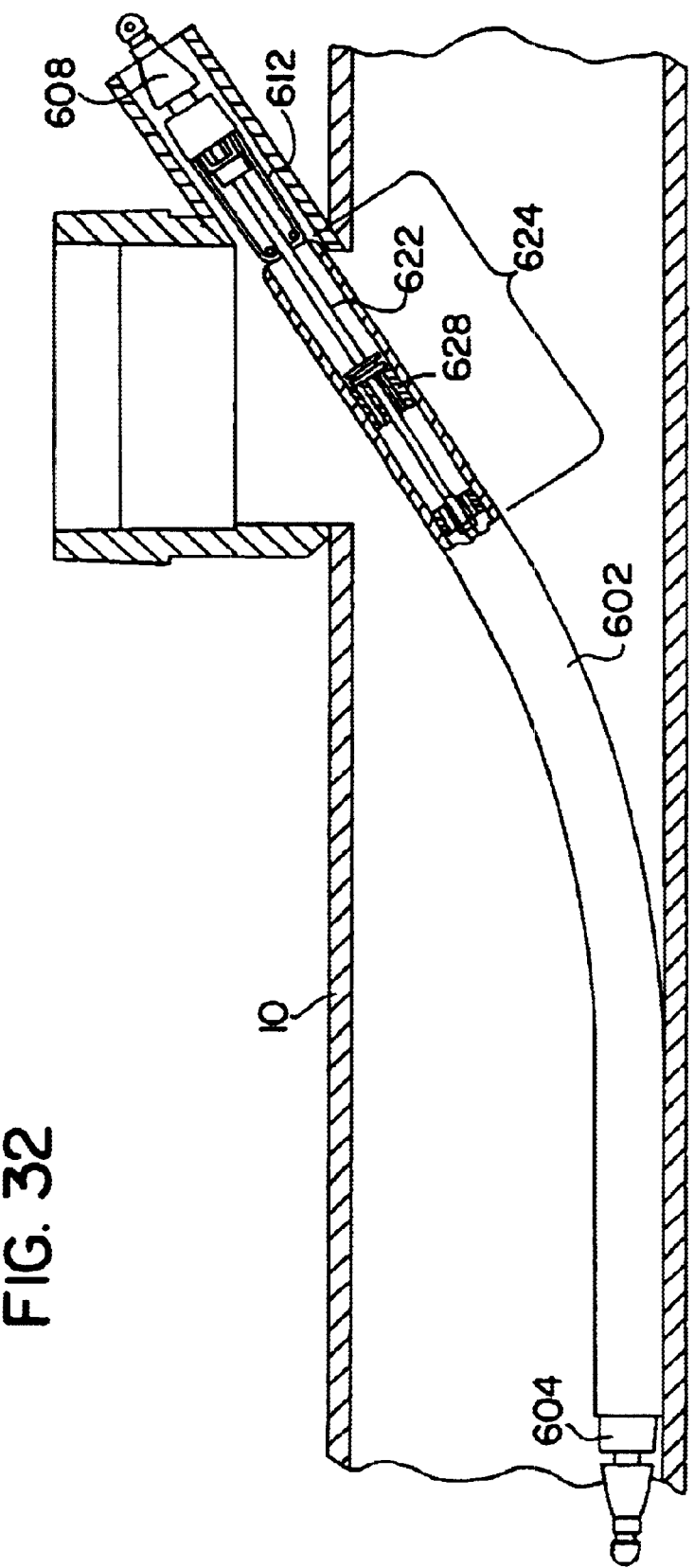
FIG. 32 is a side view of the sail assembly in position for extraction from a pipeline, or for attaching a conduit to the nose piece of the sail assembly.

FIG. 32 shows the sail assembly in the collapsed or folded position. The curved ends 620 of the sail ribs 612 are folded in adjacent to or contacting the sail cap rod 622. The front end section 624 of the sail tube 602 is relatively stiff, so that it remains straight, allowing the slide plug 628 to freely move without binding. The rest of the sail tube 602, between the slide plug 628 and the tail cap 604, is preferably flexible, so that it can bend, as shown in FIG. 32, during installation and removal from the pipeline 10. Using a quick jerking action on the sail line 632 causes the sail assembly to momentarily partially retract, to better avoid obstacles in the pipeline.

Figure 34:
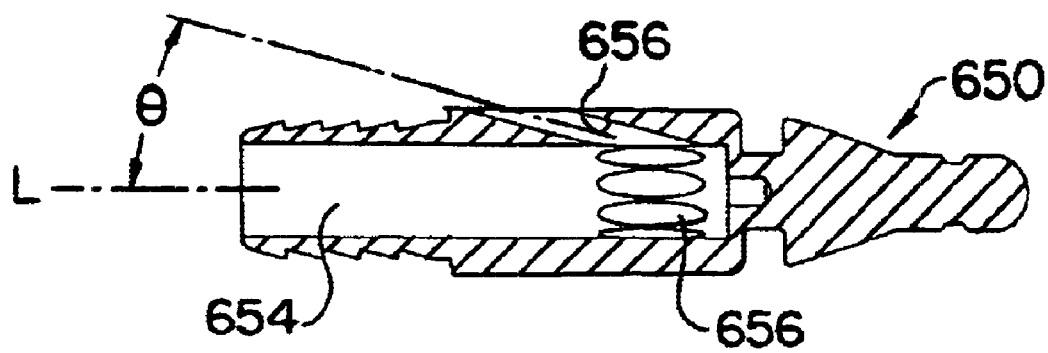
FIG. 34 is a side view of the nosepiece shown in FIG. 33.
Figure 33:
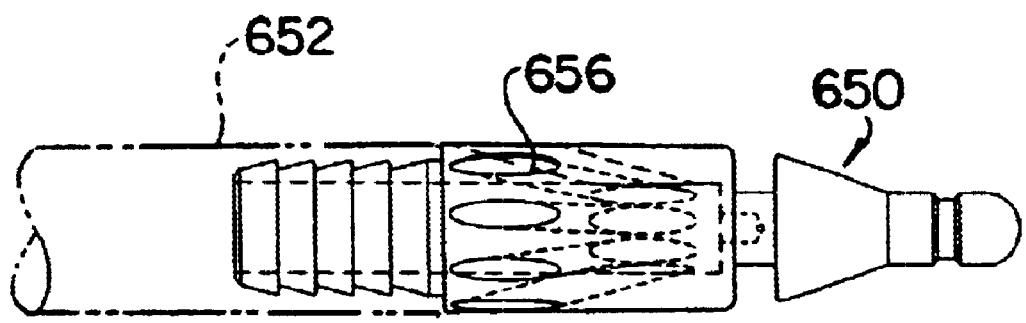
FIG. 33 is a side view of a gas jet nosepiece attached to a conduit.

Turning to FIGS. 33 and 34, a jet reaction nosepiece 650 may be used in place of the end plug 250 shown in FIGS. 9–12, to help route conduit through a pipeline. A duct 654 within the nosepiece 650 connects to jet nozzles 656. The jet nozzles 656 are oriented at an acute angle $\theta$ relative to the longitudinal axis of the nosepiece 650 and conduit 652. The angle $\theta$ is preferably between 5–50, 10–45, 15–40, or 20–35 degrees.

In use, a compressed gas, preferably natural gas, is pumped through the conduit to the nosepiece 650, from a gas source controlled by an operator, on the ground surface, or other location external to the pipeline. The gas sprays out of the jet nozzles 656. This propels the nosepiece and conduit forward through the pipeline.

Preferably, the nosepiece 650 is used in combination with a conduit pusher. Where duct rod is used with the nosepiece, a separate auxiliary compressed gas line may be used. Typically, the jetting/propelling action of the nosepiece is used only intermittently, or as needed, to provide additional temporary force moving the conduit through the pipeline. The compressed gas source may be a gas tank or cylinder. A control valve is preferably opened momentarily, as needed, to surge the nosepiece and conduit forward. An overpressure relief valve may be provided in the nosepiece so that small changes in conduit internal gas pressure caused by opening gas source valve will result in thrust out the nozzle into the pressurized gas pipeline. Preferably, as conduit is mechanically pushed through the pipeline, jetting of gas from the nosepiece assists in pulling the conduit. As the jetted gas is expelled into the operating pipeline the compressed jetting gas is preferably natural gas (at a pressure e.g., 300–700 kPa higher than the pipeline pressure). A pressure check valve may be incorporated into the nosepiece, to allow bursting of gas pressure, to minimize use of gas. While the nosepiece may exert a small amount of thrust at the head or front end of the conduit, this increases the distance that conduit may be installed within a pipeline.

Figure 36:
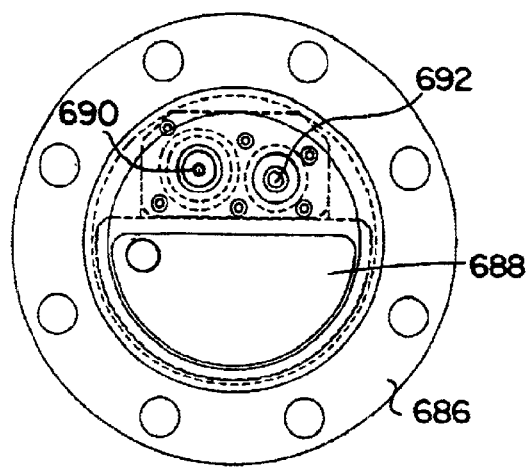
FIG. 36 is a top view of the pressure lock housing shown in FIG. 35.
Figure 35:
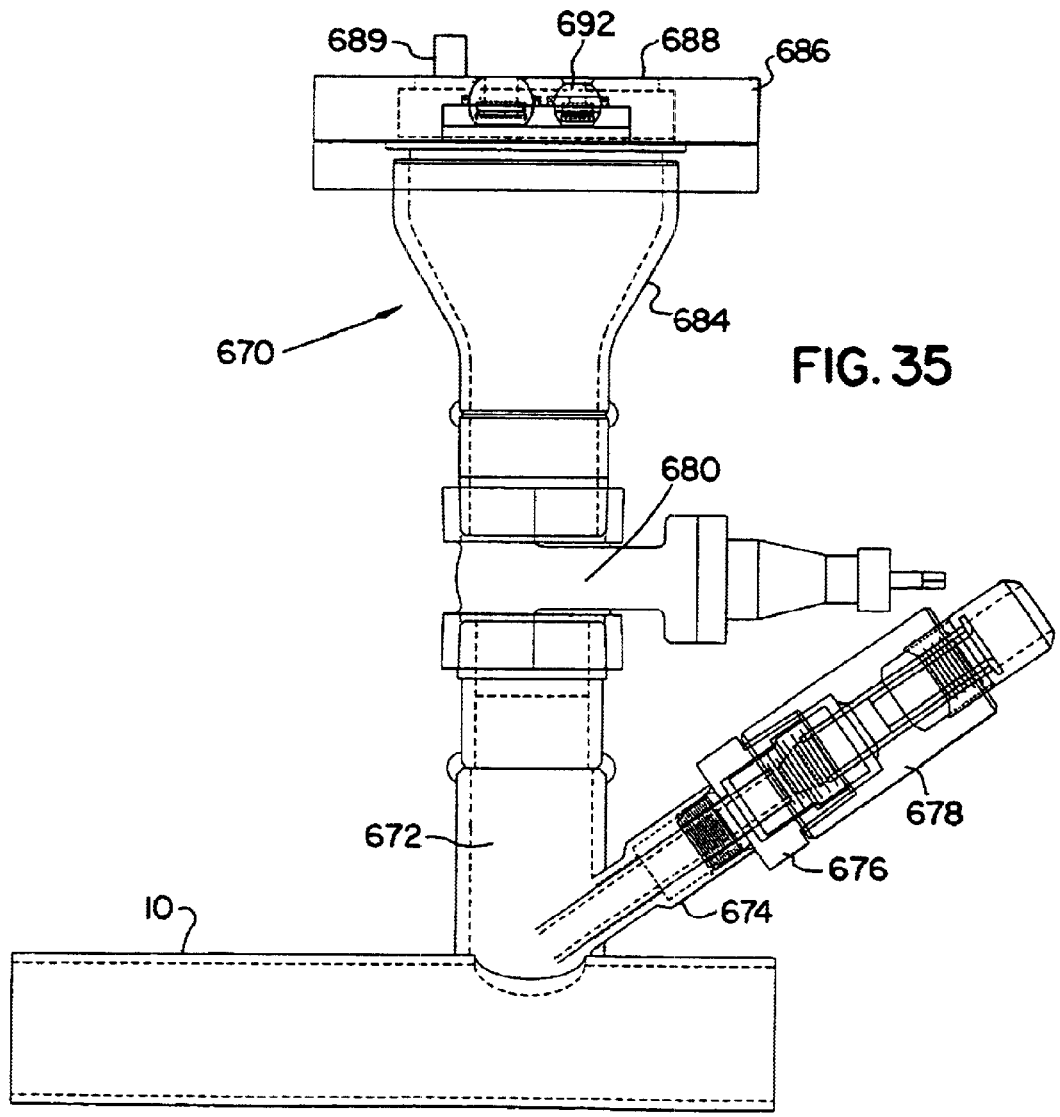
FIG. 35 is a side view of a pressure lock housing, installation valve, access fitting and side arm seals.

FIGS. 35 and 36 show an alternative pressure lock housing 670 for use as described above in connection with FIGS. 2–9. As shown in FIG. 35, the pressure lock housing 670 has a main arm 672 attached to the pipeline 10. A side arm 674 extends out of the main arm 672 or line stopper tap fitting. A gland nut 676 and shield nut 678 are provided on the side arm 674, as described above. A top flange 686 is supported on a reducer section 684 attached to the gate valve 680.

As shown in FIG. 36, a transparent plastic or glass window 688 is provided in the top flange 686. A manipulator arm assembly 690 and an assist arm assembly 692 extend through the top flange 686. One or more fixed or moveable lights 689 is preferably provided to illuminate the work area within the housing 670.

Figure 39:
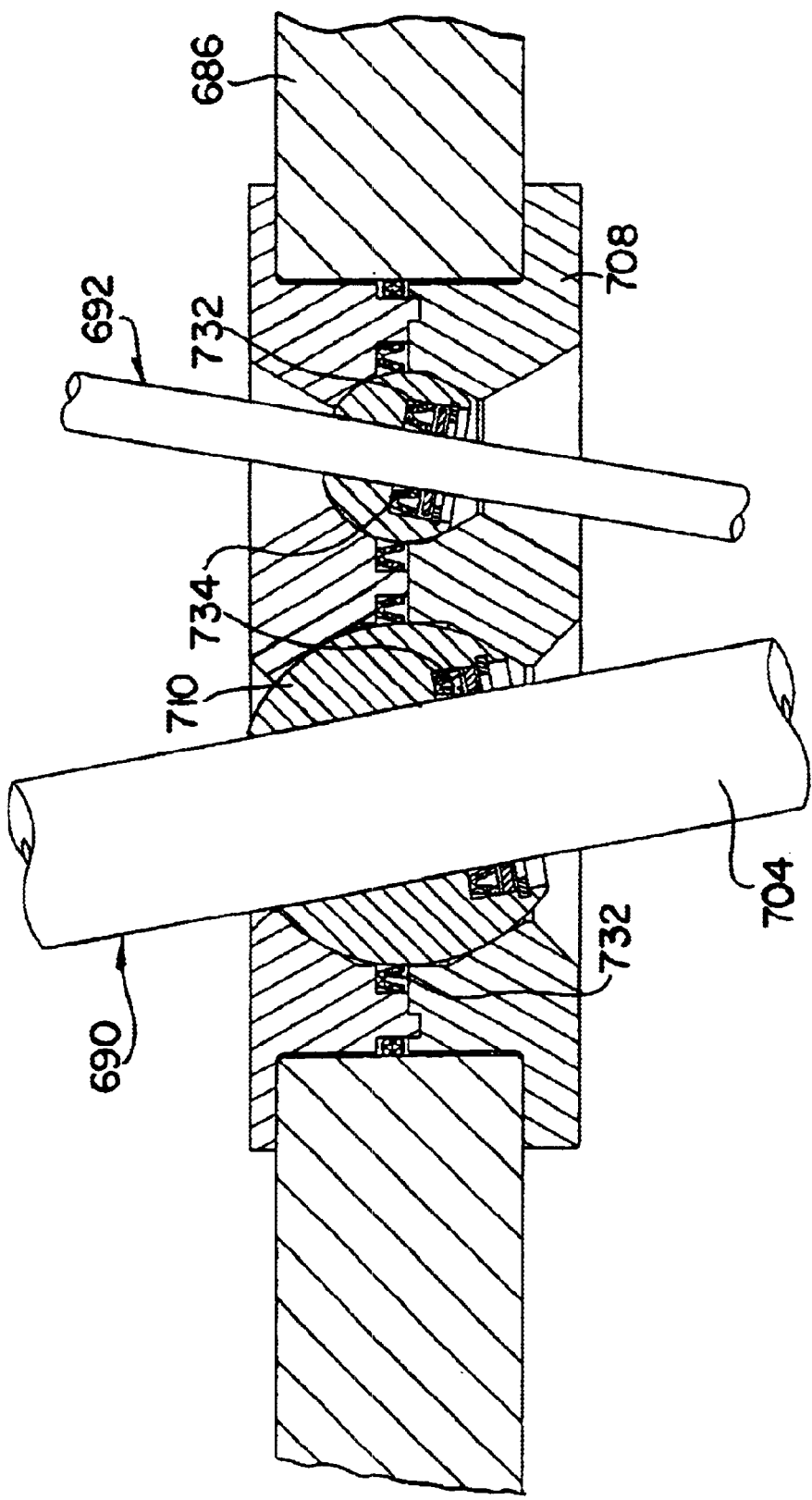
FIG. 39 is an enlarged section view of the pivot ball housing shown in FIG. 35.

Turning now to FIGS. 37–39, the manipulator arm assembly 690 has a pair of spaced apart handles 720 attached to a handle plate 702. A manipulator tube 704 is attached to the handle plate 702 via a clamp 712, at a central location. The manipulator tube 704 extends from the handle plate 702 through a pivot ball 710 in a pivot ball housing 708, to a pivot plate 714. An actuator rod 706 extends within the manipulator tube 704 from a clamp cleavis 722 on the handle plate 702 to a fork cleavis 724 within the pivot plate 714. An actuator link 726 is pivotably attached to the fork cleavis 724 and to an actuator arm 716. A pick up fork 718 is fixed to the actuator arm 716. An actuator rod clamp 730 on the handle plate 702 allows the actuator rod handle 736 joined to the clamp cleavis 722, to be locked into up and down positions, as shown in FIG. 38. A clamp collar 728 between the pivot ball housing 708 and the handle plate 702 may be clamped onto the manipulator tube 702, at various positions, to adjust the vertical position of the pickup fork 718 within the pressure lock housing 670. Referring to FIG. 39, the assist arm assembly 692 is similar in design to the manipulator arm assembly 690. However, the assist arm assembly 692 preferably has a longer tube and no pickup fork or linkages for manipulating a pick up fork. Rather, the assist arm assembly 692 preferably has a simple and finger or arm, for positioning a nosepiece or other component to be engaged by the pickup for 718 of the manipulator arm assembly 690.

Figure 40:
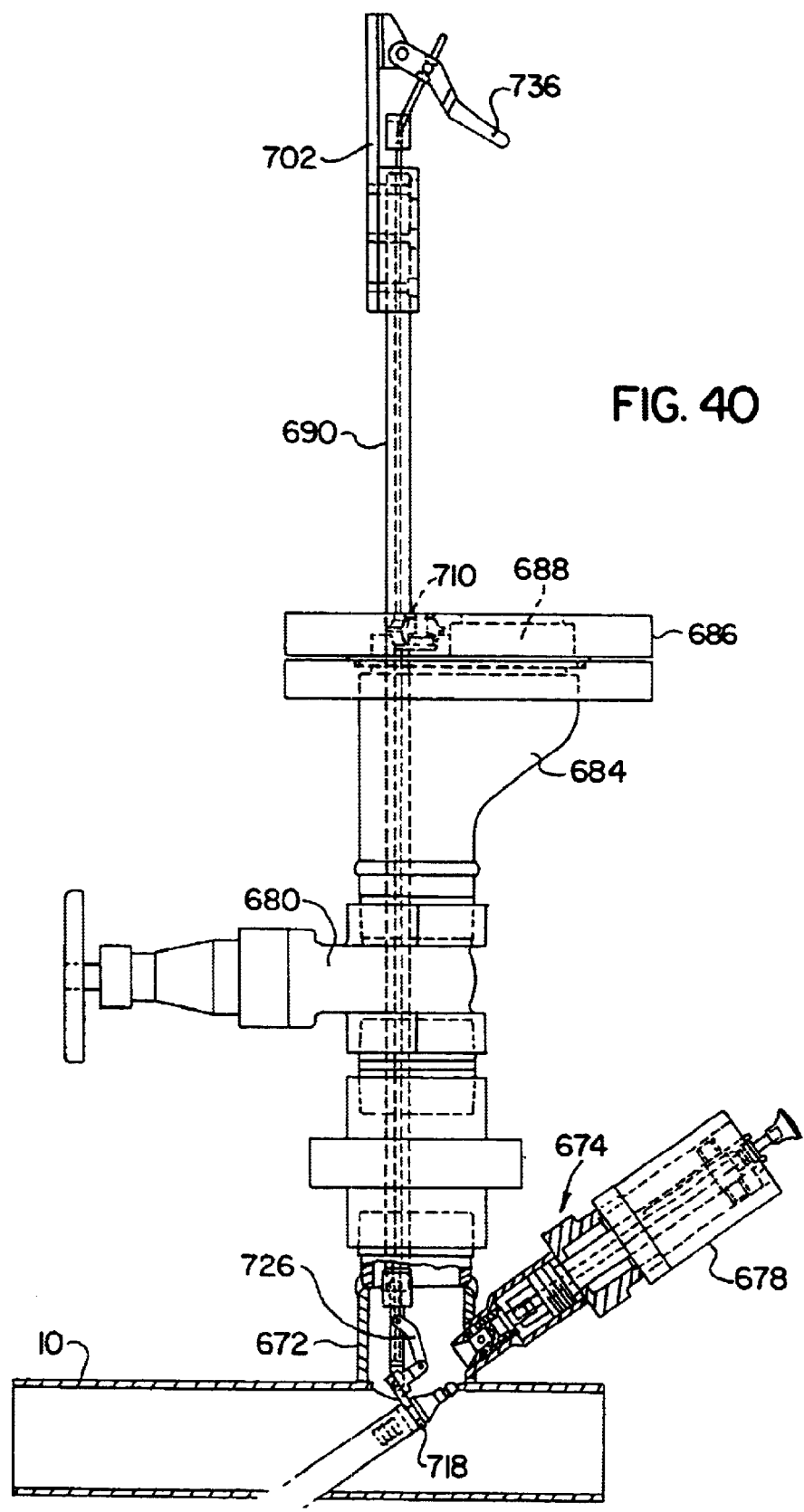
FIG. 40 is a side view of the manipulator arm assembly shown in FIGS. 37 and 38 installed in the pressure lock housing shown in FIG. 35 and also the valve, pressure housing, access fitting and side arm shown in FIG. 35. Also shown is the manipulator grasping the conduit nose fitting and orienting it for capture by manual extractor.

A ball seal 732 seals the pivot ball 710 to the pivot ball housing 708, while still allowing the pivot ball 710 to pivot. A tube seal 734 within the pivot ball 710 seals against the tube 704, while allowing the tube to slide in an out through the pivot ball 710. The manipulator arm assembly 690 is used in a way similar to the manipulators described above. The clamp collar 728 is used to hold the pick up fork 718 at a preferred vertical position. This reduces or eliminates the need for the manipulator operator to hold up the arm assembly 690 during and extraction process. With the handle 736 in the down position shown in solid line in FIG. 38, the pickup fork 718 is in the straight or engagement position. In this position, the pick up fork 718 is oriented to more easily engage a nosepiece, during an extraction. After the pickup fork 718 is engaged to the nosepiece, the handle 736 is pulled up, into the position shown in dotted lines in FIG. 38. The pickup fork 718 correspondingly moves into the dotted line position shown in FIG. 38. This orients or aligns the nosepiece, and the conduit or duct rod attached to the nosepiece, for extraction through the side arm 674 at the pressure lock housing 670, as shown in FIG. 40. The actuator rod clamp 730 clamps or locks the handle 736 in the up position, shown in dotted lines in FIG. 38, to hold the nosepiece at the preferred extraction angle (aligned with the side arm 674). The operator may then use two hands on the handles 720 to hold or manipulate the nosepiece for extraction.

An alternative extractor system 750 for removing a nosepiece from a pipeline is shown in FIG. 41. The extractor system 750 is similar to the one shown in FIGS. 9–14 and includes a receiver assembly 752 and a nose assembly 754. The nose assembly 754 preferably has a universal joint 758 attached to a duct rod 756. A heat shrink tube 760 is optionally provided around the U-joint 758. A nosepiece 762 is attached to the front section of the U-joint 758 by a setscrew 764. The nosepiece 762 is otherwise similar to the other nosepieces described above. The nosepiece 762 can pivot relative to the duct rod 756 about the first or horizontal pin 759 and the second or vertical pin 761 connecting the front and back sections of the U-joint 758.

The receiver assembly 752 has a socket 770 biased outwardly from a sleeve 774 by a compression spring 772. A plunger 778 is axially displaceable within an insert 776 secured within the sleeve 774. A plunger spring 780 urges the plunger 778 outwardly. Lock balls 784 are biased radially inwardly against the cylindrical sidewalls of the plunger 778. A barb end 782 is attached to the insert 776, for attachment to conduit 785.

In use, with reference also to FIG. 9, the receiver assembly 752 is typically held in a fixed position, e.g., in a side arm of a pressure lock fitting, as described above. The nose assembly 754 is engaged by a manipulator and moved into engagement with the receiver assembly 752. The universal joint 758 better facilitates alignment of the nosepiece 762 with the socket 770. As the nosepiece 762 moves into the socket 770, it pushes the plunger 778 back, compressing the plunger spring 780. As the groove 766 at the front end of the nosepiece 762 comes into alignment with the lock balls 784, the lock balls 784 move radially inwardly into the groove 766. This automatically locks the nosepiece 762 into the receiver assembly 752 as they are brought together. The duct rod 756 or conduit 785 may then be pushed or pulled out of the pipeline. After the extraction joint 750 is removed from the pipeline, the nosepiece 762 is released by pulling the sleeve 774 forward over the socket 770, allowing the lock balls 784 to move radially outwardly, releasing the nosepiece 762.

An alternative manual extractor tool 800 for use with conduit, as shown in FIGS. 42 and 43, includes a socket 804 within a collar 808. The collar 808 has a step section 810, and a land section 812, having a smaller diameter than the step section 810. The socket 804 is attached to a lock rod 818 extending through an extractor tube 816, via a universal joint 814. A tube handle 822 is attached to the extractor tube. A knob 820 is attached to the back end of the lock rod 818. Retainers 806 extend inwardly through radial openings in the socket 804. A latch 824 at the back end of the tool 800 latches or locks the lock rod 818 into either an engaged or disengaged position.

FIG. 42 shows the disengaged position. As shown, the retainers 806 are withdrawn or moved radially outwardly on the socket 804, with the outside ends of the retainers 806 on the step section 810. The collar 808 is seated onto the front end of the extractor tube 816. In this position, the tool 800 is ready to engage a nosepiece 826 on the leading end of a conduit 785.

The tool 800 is typically installed through a side arm, such as side arm 674 of a pressure lock housing. The seals within the side arm seal against the extractor tube 816, to prevent gas leakage. A manipulator, such as manipulator 690, manipulates the nosepiece 826 into alignment with the socket 804. The tool operator pushes the tool forward, preferably via force on the tube handle 822. The socket 804 engages the nosepiece 826. The groove 766 on the nosepiece 826 moves into alignment with the retainers 806.

To securely attach the tool 800 to the nosepiece 826, the knob 820 and lock rod 818 are pushed forward. As this occurs, the collar 808 moves forward over the socket 804. Consequently, the land area 812 of the collar 808 moves over the outside ends of the retainers 806, driving the retainers radially inwardly into the groove 766 on the nosepiece 826. The nosepiece is then securely locked together with the tool 800. The latch 824 is moved up, to prevent the knob 820 and the lock rod 818 from being inadvertently pulled back and releasing the nosepiece 826. This manual lock prevents gas pressure in the pipe from unlocking the mechanism. In contrast to the manual design shown in FIGS. 42 and 43, the other latching designs of FIGS. 9–14 and 41 are automatic.

The tool 800 and conduit 785 attached to the tool via the nosepiece 826 is pulled back out of the side arm 674, by pulling on the tube handle 822. After the tool 800 and nosepiece 826 are entirely withdrawn out of the side arm 674, the latch 824 is pushed down and the knob 820 is pulled back. This returns the tool 800 to the position shown in FIG. 42, and allows the nosepiece 826 to be released.

An alternative receiver assembly 840 for engaging and extracting a nosepiece on conduit, is shown in FIGS. 44 and 45. The receiver assembly 840 has a handle 842 attached to a pull bar 844. A socket 846 extends into sleeve 848 attached to the front end of the pull bar 844. An insert 850 within the socket 846 is biased outwardly by an insert spring 854. In the disengaged position, the insert 850 keeps lock balls 856 spaced outwardly into openings in the socket 846. A sleeve spring 852 urges the sleeve 848 outwardly over the socket 846. A pawl 858 is pivotably attached to the pull bar 848 via a pawl pivot pin 860. A pawl screw 864 extends radially inwardly through a clearance hole in the pawl 858. A pawl spring 864 around the pawl screw 862 biases the pawl 858 outwardly.

In use, as the receiver 840 is engaged with a nosepiece, the insert 850 is pushed inwardly. The lock balls 856 move into the groove in the nosepiece, via the sleeve 848 urging them inwardly. As the lock balls 856 move into the groove, and the sleeve 848 moves forward over the socket 846, the pawl 858 springs outwardly. This prevents the sleeve 848 from being pulled back, or pushed by internal pipe gas pressure and releasing the nosepiece, until the pawl 858 is pushed down.

FIG. 47 shows the receiver assembly 840 of FIG. 44 in use in a pressure lock housing on a pipeline. The pull bar 844 is sealed via O-rings or other seals or packings 906 within a seal housing 905. A retainer 907 has over hanging side arms for holding the receiver assembly 840 in place, against the gas pressure in the pipeline which tends to push the receiver assembly 840 out.

FIG. 46 shows an alternative extractor assembly 900 having a receiver assembly 752 as described above in connection with FIG. 41. In addition, a conduit holder clamp 12 is clamped around the conduit 785 via fasteners. A handle 914 extends outwardly from each side of the clamp 912. The handles 914 are used for moving the receiver assembly through the seals in the pressure lock housing.

Referring still to FIG. 46, duct rod 756 is attached to a nosepiece 826. The duct rod 756 extends through a rod gland assembly 902, which is installed onto the duct rod before the duct rod is attached to the nosepiece (e.g., via adhesives or screw threads). The rod gland assembly 902 includes packings 906 and washers 908 within a gland body 904. A gland nut 910 holds the packings 906 and washers 908 in place.

In use, before an access opening is drilled or cut into the pipeline, the rod gland assembly 902 is threaded onto a pipeline access fitting, such as a side arm of an air lock housing, preferably via pipe or screw threads 905 at the front end of the gland body 904. The gland nut 910 is tightened sufficiently to seal around the duct rod, to minimize or avoid gas leakage, while still allowing the duct rod to be pushed or pulled through the rod gland assembly. With the rod gland assembly in place, a hole is drilled or cut into the pipeline, as described above. The packings 906 provide a seal around the duct rod. The duct rod is then routed through the pipeline as described above.

In this method, the nosepiece is already in the air lock housing or other fitting, before the opening is made into the pipeline. Consequently, the need to exert a large force on the duct rod, either manually or with a rod driver 60, to overcome the force of the gas pressure acting on the nosepiece, is avoided. The force of the gas pressure may be substantial, depending on the pressure and the size of the nosepiece.

Referring still to FIG. 46, the nosepiece 826 and duct rod 756 are routed through the pipeline to an exit fitting. At the exit fitting, the receiver 752 is attached to the nosepiece, as described above. The duct rod 756 is then pulled back to the entry fitting. At the entry fitting, the conduit, which has a larger diameter than the duct rod 756, is pulled through seals in the entry fitting. The pipeline is then sealed at the entry fitting via the outside surface of the conduit in sealing engagement with seals in the entry fitting. The rod gland assembly 902 can then be removed from the entry fitting, as the seal provided by the packings 906 is not longer needed. With the rod gland assembly 902 removed, the duct rod 756 and the nosepiece 826 attached to the receiver 752 are pulled back out of the exit fitting. The nosepiece 826 is then released from the receiver 752 by pulling the sleeve 774 forward.

The systems and methods described above may also be used to upgrade existing gas pipe through insertion of new gas pipe inside of the old pipe. The newly installed gas pipe (gas pipe innerduct) may also be used to house a telecommunications conduit (fiber innerduct) and fiber cable.

Natural gas utilities are constantly replacing and upgrading their distribution pipeline systems. These efforts are undertaken for a variety of reasons, including situations when the pipe's useful life is reached, when demand requires that additional supplies be distributed or when improved pipeline materials become available. In many cases, a lower pressure pipeline system can be upgraded to a higher-pressure system by installation of pipe with a substantially smaller diameter.

In urban areas, replacement or upgrade of distribution systems is especially problematic since open trenching costs are very high and public disruption significant. Alternatives to trenching include various methods for insertion of "casing" into the existing pipelines. This process, while generally more acceptable than trenching, is also costly. Many casing methods require de-pressurization of the pipeline while the casing is being installed. This is costly to the utility and can disrupt service to substantial numbers of customers for extended time periods.

The methods described above may be used for conduit installation into live gas pipelines. The conduit is preferably polyethylene or plastic gas pipe. The process and fittings can be used to install 10–50 mm diameter or preferably larger plastic pipe into larger cast iron, steel or plastic pipes. The primary advantages of using the process to upgrade existing gas pipelines are:

The existing pipeline does not have to be de-pressurized or removed from service; and If fiber inner duct is concurrently installed, the construction cost can be shared between the gas and telecommunications companies.

If fiber inner duct is installed, exit locations using appropriately sized fittings can be installed at periodic locations prior to pressuring the gas innerduct and bringing it into service. In addition, gas service connections can also be attached at the gas innerduct entry/exit locations from the existing pipe prior to pressurizing the new gas pipe.

Continuous service to the customer is maintained throughout the entire live insertion process by maintaining pressurized gas in the annular space between the outside diameter of the inserted gas innerduct and the inside diameter of the existing main. Since gas service is unaffected, this allows customers to be systematically transferred to the newly inserted main at a later time, with consideration of manpower and equipment resources, as well as utility customer convenience.

Figure 49:
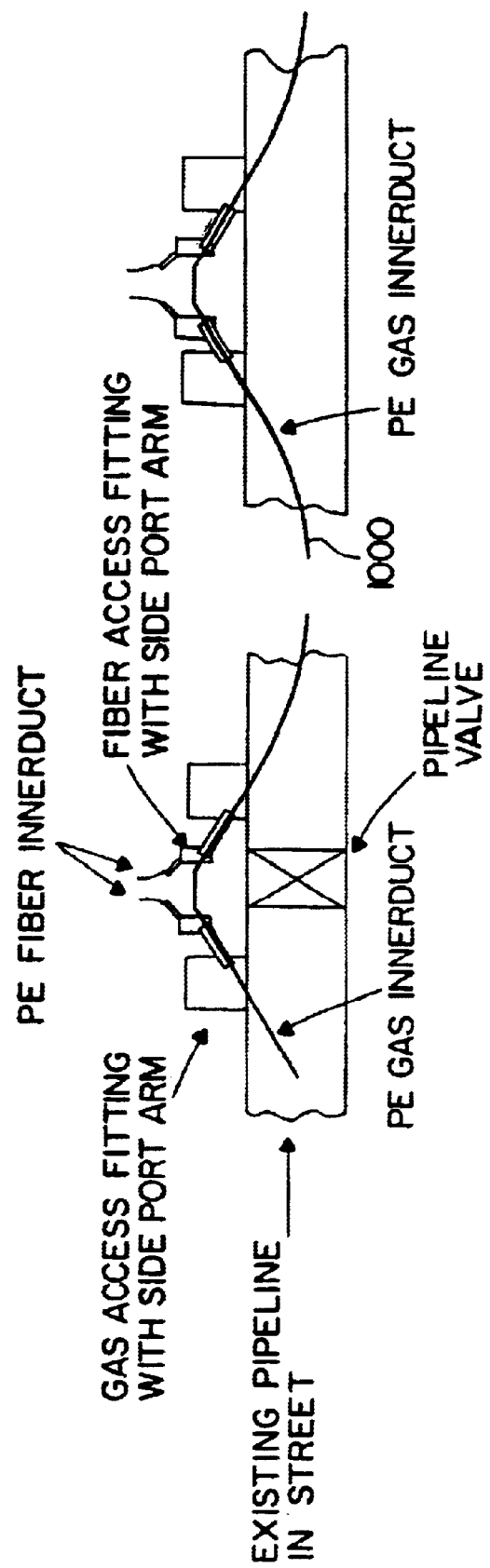
FIG. 49 is a schematic diagram of a system and method for installing a gas pipe inner duct within a pipeline.

FIG. 49 shows installation of a new pipeline within an existing (and typically buried) pipeline. The plastic gas innerduct 1000 is routed through fittings in the same ways as a conduit or cable, as described above.

Thus novel methods, components and systems have been described. Various changes and substitutions may of course be made all within the spirit and scope of the invention. The invention, therefore, should not be limited, except to the following claims and their equivalents.

What is claimed is:

1. A pressure lock housing for use in installing a conduit or cable into a pressurized gas pipeline, comprising;
   a main arm;
   a side arm attached to the main arm at an angle;
   a seal assembly within the side arm; and
   at least one manipulator arm assembly extending through a pivot joint on the main arm, the manipulator arm assembly rotatable and extendable at an angle from vertical within the main arm to allow the manipulator arm assembly to position the cable or conduit, or an end fitting on the cable or conduit, for extraction from the pipeline.

2. A manipulator for ase in installing a cable or conduit in a pressurized pipeline, comprising:
   a manipulator tube;
   a pivot plate attached to the manipulator tube;
   an engagement end pivotably supported on the pivot plate and adapted to engage an end nose attached to a conduit or translating member in the pipeline;
   an actuator rod linked to the engagement end;
   a handle on the actuator rod;
   a pivot ball around the manipulator tube, and a seal associated with the pivot ball, and with the manipulator tube slidable through the pivot ball.

3. A pressure lock housing comprising:
   a lower main attn attachable to a pipeline;
   a side arm attached to the lower main arm at an acute angle;
   a valve attached to the lower main arm;
   an upper main arm attached to the valve;
   at least one manipulator having a first end extending out of the upper main arm, and a second end extendable through the upper main arm and the lower main arm into the pipeline for manipulating a leading end of the cable or conduit so that it can be routed through the side arm; and
   a seal sealing the manipulator to the upper main arm.

4. The pressure lock housing of claim 3 further comprising a ball joint on the upper main arm, with the seal on the ball joint, and with the first end of the manipulator slidable through the ball joint.

5. The pressure lock housing of claim 3 further comprising a window on the upper main arm.

6. The pressure lock housing of claim 3 wherein the upper main arm comprises a reducer section.

7. The pressure lock housing of claim 3 further comprising an assist arm having a first end extending out of the upper main arm, and a second end extendable through the upper main arm and the lower main arm, and an assist arm seal sealing the assist arm to the upper main arm.

8. The pressure lock housing of claim 3 further comprising a clamp collar around the manipulator.

9. The pressure lock housing of claim 3 further comprising a seal assembly in the side arm.

10. The pressure lock housing of claim 3 with the seal comprising:
    a pivot ball housing on the upper main arm;
    a pivot ball pivotable within the pivot ball housing;
    a ball seal sealing the pivot ball to the pivot ball housing; and
    a tube seal In the pivot ball sealing the pivot ball to the manipulator.

11. A pressure housing for use in installing a cable or conduit into a natural gas pipeline, comprising:
    a lower main arm attachable to the pipeline;
    a side arm attached to the lower main arm at an acute angle;
    a valve attached to the lower main arm;
    an upper main arm attached to the valve; and
    a manipulator supported on the upper main arm and extendable into the pipeline to allow the manipulator arm assembly to position the cable or conduit, or an end fitting on the cable or conduit, for extraction from the pipeline.

12. The pressure housing of claim 11 further including a transparent viewing port on the upper main arm.

13. A system for use in installing a cable or conduit into a pressurized natural gas pipeline, comprising:
    an access fitting including a main arm attachable to the pipeline;
    a side arm connecting at an acute angle into the main arm;
    a pressure housing attachable to a valve on the main arm;
    a manipulator on the pressure housing and, with the manipulator extendable into the pipeline to grasp a leading end of the cable or conduit, or an end fitting on the cable or conduit, for routing the leading end through the side arm and out of the pressure housing;
    a pipeline cutting machine attachable to the valve, for cutting a hole in the pipeline, within the access fitting, and with the cutting machine removable from the valve, to allow attachment of the pressure housing to the valve.

14. The system of claim 13 further comprising a completion plug in the pressure housing.

15. A pressure lock housing comprising:
a lower main arm;
a side arm attached the lower main arm at an acute angle;
a valve attached to the lower main arm;
an upper main arm attached to the valve;
at least one manipulator having a first end extending out of the upper main arm, and a second end extendable through the upper main arm and the lower main arm, with the manipulator including:
a manipulator tube extending through a pivot ball housing on the upper main arm;
a handle plate attached to a first end of the manipulator tube, outside of the upper main arm;
a pivot plate attached to a second end of the manipulator tube;
an actuator rod extending within the manipulator tube; and
a pick up fork on the pivot plate and linked to the actuator rod; and
a seal sealing the manipulator to the upper main arm.

16. A pressure lock housing comprising:
a lower main arm;
a side arm attached to the lower main arm at an acute angle;
a seal assembly in the side arm, with the seal assembly comprising:
a service head adapter attached to a shield nut;
a stiffener within, the service head adapter;
an annular seal within the shield nut and engaged against the service head adapter;
a pipe section extending through the shield nut, from the service head adapter to a socket reducer;
a gland nut around the socket reducer and engaged with the shield nut, with the gland nut sealed against the side arm of the access fitting;
a valve attached to the lower main arm;
an upper main arm to the valve;
at least one manipulator having a first end extending out of the upper main arm, and a second end extendable through the upper main arm and the lower main arm; and
a seal scaling the manipulator to the upper main arm.

17. A pressure lock housing comprising:
a lower main arm;
a side arm attached to the lower main arm at an acute angle;
a valve attached to the lower main arm;
an upper main arm attached to the valve;
at least one manipulator having a first end extending out of the upper main arm, and a second end extendable through the upper main arm and the lower main arm, for grasping a leading end of the cable or conduit, or an end fitting on the cable or conduit, to route the leading end through the side arm and out of the pressure housing;
a light on the upper or lower main arm; and
a seal sealing the manipulator to the upper main arm.

* * * * *